(12) United States Patent
Quagliata

(10) Patent No.: US 11,682,089 B2
(45) Date of Patent: Jun. 20, 2023

(54) OPEN HOUSE REALTY SYSTEM, SERVER AND METHOD

(71) Applicant: Shannon Lee Quagliata, Scottsdale, AZ (US)

(72) Inventor: Shannon Lee Quagliata, Scottsdale, AZ (US)

(73) Assignee: Shannon Lee Quagliata, Scottsdale, AZ (US)

( * ) Notice: Subject to any disclaimer, the term of this patent is extended or adjusted under 35 U.S.C. 154(b) by 756 days.

(21) Appl. No.: 16/352,748

(22) Filed: Mar. 13, 2019

(65) Prior Publication Data

US 2019/0287193 A1    Sep. 19, 2019

Related U.S. Application Data

(60) Provisional application No. 62/642,510, filed on Mar. 13, 2018.

(51) Int. Cl.
| | | |
|---|---|---|
| G06F 3/048 | (2013.01) |
| G06Q 50/16 | (2012.01) |
| G06Q 10/1093 | (2023.01) |
| G06F 16/27 | (2019.01) |
| G06F 3/0482 | (2013.01) |
| H04N 7/18 | (2006.01) |
| G06F 3/04812 | (2022.01) |

(52) U.S. Cl.
CPC ........... *G06Q 50/163* (2013.01); *G06F 16/27* (2019.01); *G06Q 10/1095* (2013.01); *G06F 3/0482* (2013.01); *G06F 3/04812* (2013.01); *H04N 7/185* (2013.01)

(58) Field of Classification Search
CPC .. G06Q 50/163; G06Q 10/1095; G06F 16/27; G06F 3/04812; G06F 3/0482; H04N 7/185
See application file for complete search history.

(56) References Cited

U.S. PATENT DOCUMENTS

| | | | | |
|---|---|---|---|---|
| 8,688,594 | B2 * | 4/2014 | Thomas | G06Q 50/16 |
| | | | | 705/314 |
| 10,929,911 | B2 * | 2/2021 | Beatty | G06F 16/487 |
| 10,963,936 | B2 * | 3/2021 | Spath | G06Q 30/0282 |
| 11,069,010 | B1 * | 7/2021 | Shenoy | G06F 16/951 |
| 2011/0238586 | A1 * | 9/2011 | Mainville | G06Q 30/02 |
| | | | | 705/313 |

(Continued)

*Primary Examiner* — David Phantana-angkool
(74) *Attorney, Agent, or Firm* — Greenberg Traurig, LLP

(57) ABSTRACT

Some embodiments include a computer-implemented method of providing a computer system including a processor and access to at least one coupled source of real estate records. A storage medium includes program logic that when executed by a coupled processor, causes the computer system to access or exchange data with a realty database of real estate property data. The execution of program logic by an application programming interface results in upload and/or download of real estate property data to or from a realty database. An event engine is executed to manage an open house event of property including scheduling of a date and time of the open house event, and the scheduling of a prospective buyer. A statistics engine is executed to record open house real estate data including attribute data of the prospective buyer prior to and/or during an open house event.

21 Claims, 27 Drawing Sheets

(56) References Cited

U.S. PATENT DOCUMENTS

| | | | |
|---|---|---|---|
| 2012/0246024 A1* | 9/2012 | Thomas | G06Q 50/16 |
| | | | 705/26.41 |
| 2018/0060980 A1* | 3/2018 | Stachowski | G06Q 40/06 |
| 2018/0075552 A1* | 3/2018 | Mehranvar | G06Q 30/0639 |
| 2019/0043145 A1* | 2/2019 | Morgan | G06Q 50/01 |
| 2019/0139115 A1* | 5/2019 | Wickam | G06Q 30/0619 |
| 2019/0156444 A1* | 5/2019 | Targownik | G06Q 50/163 |
| 2019/0164240 A1* | 5/2019 | Barbara | G06Q 50/163 |
| 2019/0251644 A1* | 8/2019 | Hague | H04L 67/55 |
| 2019/0304039 A1* | 10/2019 | Wickersham | G06Q 30/0201 |
| 2020/0118227 A1* | 4/2020 | Ahmed | G06Q 30/0603 |
| 2020/0202420 A1* | 6/2020 | Van Dyke | G06Q 30/0645 |
| 2020/0219212 A1* | 7/2020 | Robinson | G06Q 50/16 |

* cited by examiner

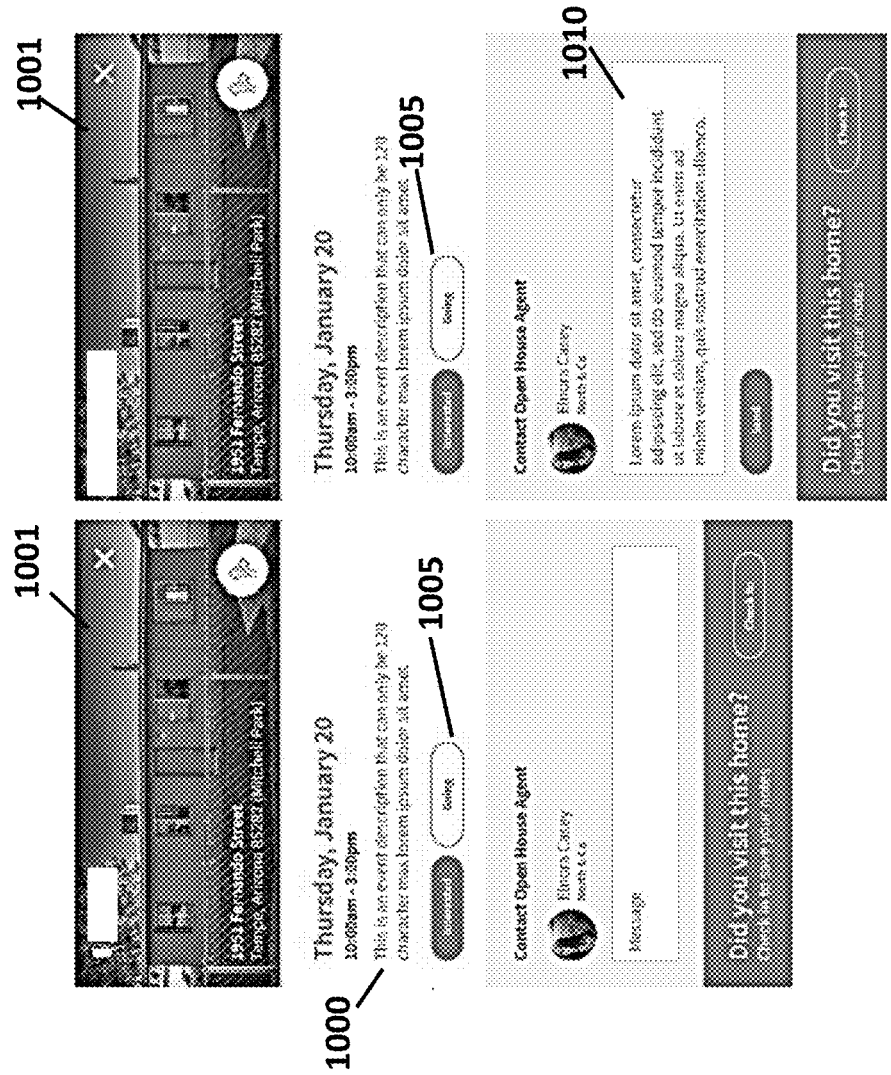

OPEN HOUSE REALTY SYSTEM, SERVER AND METHOD

CROSS-REFERENCE TO RELATED APPLICATIONS

This application claims the benefit of and priority to U.S. Provisional Patent Application No. 62/642,510, filed Mar. 13, 2018, entitled "OPEN HOUSE REALTY SYSTEM AND METHOD", the entire contents of which are incorporated herein by reference.

BACKGROUND

The sale of real estate through an "open house" type of marketing has grown in popularity over the past decade. An open house event typically allows prospective buyers to tour a property on a specific day during a scheduled time. There are many advantages of an open house sales approach, such as enabling the seller to schedule preparation and/or staging a property to attract potential buyers. This is especially convenient for a property that is still occupied by the seller. A well-organized open house event can increase the number of potential buyer visits, increase the number of offers, and reduce the time the property is on the market.

While there has been a proliferation of online real estate sales and marketing services and tools dedicated to conventional real estate sales and marketing, most do not support open house events, and thus do not enable the generation of an efficient open house marketing plan. Further, conventional realty services do not enable the addition of property listings that are not on a multiple listing service, and do not provide a platform to advertise "off market", "pre-MLS", and "coming soon" types of properties.

Accordingly, there exists a need for a system, server and method that focus on marketing and promoting open house events. It would be advantageous to provide prospective buyers with a new way to attend open houses with less stress, while also providing prompt feedback on the relevant real estate.

SUMMARY

Some embodiments include a computer-implemented method comprising providing a computer system including at least one processor coupled to at least one non-transitorily stored real estate database, and providing at least one non-transitory computer-readable storage medium in data communication with the at least one processor. In some embodiments, the at least one non-transitory computer-readable storage medium includes program logic that when executed by the at least one processor, causes the computer system to access or exchange data with the real estate database comprising open house data related to at least one property intended to be marketed through an open house event.

Some embodiments include a computer-implemented method providing an application programming interface in data communication with the at least one processor and the at least one non-transitory computer-readable storage medium, and executing at least a portion of the program logic by the application programming interface to upload and/or download the real estate database. Some embodiments include a computer-implemented method comprising creating a user interface to a source of client data that is configured to read and transfer client data under control of a user via the application programming interface to a user display. Some embodiments include providing a digital gateway coupled to the application programming interface and enabling by the at least one processor a distributed access to 3rd party real estate information of at least one property.

Some embodiments include executing an event engine by at least a portion of the program logic executable by the at least one processor to manage at least one of the open house events of the at least one property including scheduling of a date and time of the at least one open house event and the scheduling of attendance of at least one prospective buyer. Some embodiments include executing a statistics engine by at least a portion of the program logic executable by the at least one processor to record open house real estate data including attribute data of the at least one prospective buyer prior to and/or during the at least one open house event.

In some embodiments, the attribute data comprises a position, movement, or behavior of the at least one prospective buyer during an open house event. In some embodiments, the position, movement, or behavior of the at least one prospective buyer is received from at least one sensor coupled to the computer system. In some further embodiments, the at least one sensor is coupled to the at least one prospective buyer and provides at least geo-location information to the computer system. In some embodiments, the at least one sensor provides information to the computer system as the open house real estate data enabling automatic check-in of the at least one prospective buyer. In some embodiments, the at least one sensor comprises a camera. In some further embodiments, the at least one sensor is carried or worn by the at least one prospective buyer. In some further embodiments, the at least one sensor is positioned in the at least one property.

In some embodiments, at least some of the open house data comprises sensor data from the at least one sensor. In some embodiments, the sensor data can be an image or video of the at least one prospective buyer, and/or at least one body or physical appearance image of the at least one prospective buyer, and/or at least one object worn or carried by the at least one prospective buyer, at least one gesture of the at least one prospective buyer, and/or at least one portion of an environment data surrounding the at least one prospective buyer.

In some embodiments, the attribute data comprises preference data received by the statistics engine from a prospective buyer prior to, during, and/or after an open house event. In some embodiments, the preference data includes the size of the at least one property, and/or a number and/or size of bedrooms in the at least one property, and/or a number and/or size of bathrooms in the at least one property, and/or a type of finish, and/or a type of landscaping, and/or a type of neighborhood, location, a price, a price range, and feedback on the at least one property by the at least one prospective buyer.

In some embodiments, the feedback comprises at least one rating selected by the at least one prospective buyer from a display on the user display. In some embodiments, the display on the user display includes at least one rating influence selectable by the at least one prospective buyer. In some embodiments, the at least one rating influence includes a floorplan, and/or size of bedrooms, and/or size of bathrooms, and/or kitchen, and/or finishes, and/or landscaping, and/or neighborhood, and/or price.

In some embodiments, the at least one open house event includes a display on the user display of exclusively open house data. In some embodiments, the open house data is displayed on a map on the user display and is filterable for display on the map by type of property selected from a group of houses, condominiums, townhomes, and manufactured homes, size of the at least one property, and/or a number and/or size of bedrooms in the at least one property, and/or a number and/or size of bathrooms in the at least one property, and/or a type of finish in the at least one property, and/or a type of landscaping at the at least one property, and/or a type of neighborhood, a location of the at least one property, and/or a sales status of the at least one property, and/or a price or price range of the at least one property.

In some embodiments, the at least one open house event includes generating a display on the user display comprising check-in data of at least one prospective buyer, and/or rating data from the at least one prospective buyer, and/or a guest list, and/or an event chat window related to the at least one property of the at least one open house event.

Some embodiments include a realty marketing system comprising a computer system including at least one processor coupled to a digital gateway coupled to provide distributed access to non-transitorily stored real estate information relating to at least one property, and at least one non-transitory computer-readable storage medium in data communication with the at least one processor that is configured for accessing or exchanging data with a real estate database. Some embodiments include an application programming interface in data communication with the at least one processor and the at least one non-transitory computer-readable storage medium. In some embodiments, the application programming interface includes program logic executable by the at least one processor for uploading, downloading, and/or enabling access of data from the real estate database related to at least one property intended to be marketed as an open house.

Some embodiments include an interface to a source of client data or records that is configured to read and transfer client data under control of a user via the application programming interface to a user display. Some embodiments include an event engine including logic executable by the at least one processor to manage at least one open house event of the at least one property including scheduling of a date and time of the at least one open house event and the scheduling attendance of at least one prospective buyer. Some embodiments include a statistics engine including logic executable by the at least one processor to record attribute data of the at least one prospective buyer prior to and/or during the at least one open house event.

In some embodiments, the attribute data comprises preference data received by the statistics engine of the at least one prospective buyer prior to, during, and/or after open house event. In some embodiments, preference data includes the size of the at least one property, and/or a number and/or size of bedrooms in the at least one property, and/or a number and/or size of bathrooms in the at least one property, and/or a type of finish, and/or a type of landscaping, and/or a type of neighborhood, and/or location, and/or a price or price range.

In some further embodiments, the preference data includes feedback on the at least one property by the at least one prospective buyer, and where the feedback comprises at least one rating selected by the at least one prospective buyer from a display on the user display, and a rating influence selectable by the at least one prospective buyer. Further, the at least one rating influence includes a floorplan, and/or size of bedrooms, and/or size of bathrooms, and/or kitchen, and/or finishes, and/or landscaping, and/or neighborhood, and/or price.

In some embodiments of the invention, the scheduling of attendance of at least one prospective buyer is based on receipt of a response from the at least one prospective buyer from an invitation sent by a listing agent of the at least one property of the at least one open house event.

DESCRIPTION OF THE DRAWINGS

FIGS. 7A-7D illustrate real estate agent sign-in and/or new account portal displays in accordance with some embodiments of the invention.

FIGS. 10A-10D illustrate event card pop-up displays in accordance with some embodiments of the invention.

FIG. 14 illustrates a detailed property listing display in accordance with some embodiments of the invention.

FIG. 17 illustrates a listing/event details page in accordance with some embodiments of the invention.

FIG. 18 illustrates a favorites display page in accordance with some embodiments of the invention.

FIG. 19 illustrates an upcoming event manager display page in accordance with some embodiments of the invention.

FIG. 21 illustrates an on the market my listings page in accordance with some embodiments of the invention.

FIG. 23 illustrates a client profile page in accordance with some embodiments of the invention.

FIG. 25 illustrates a notifications page in accordance with some embodiments of the invention.

DETAILED DESCRIPTION

Figure 1:
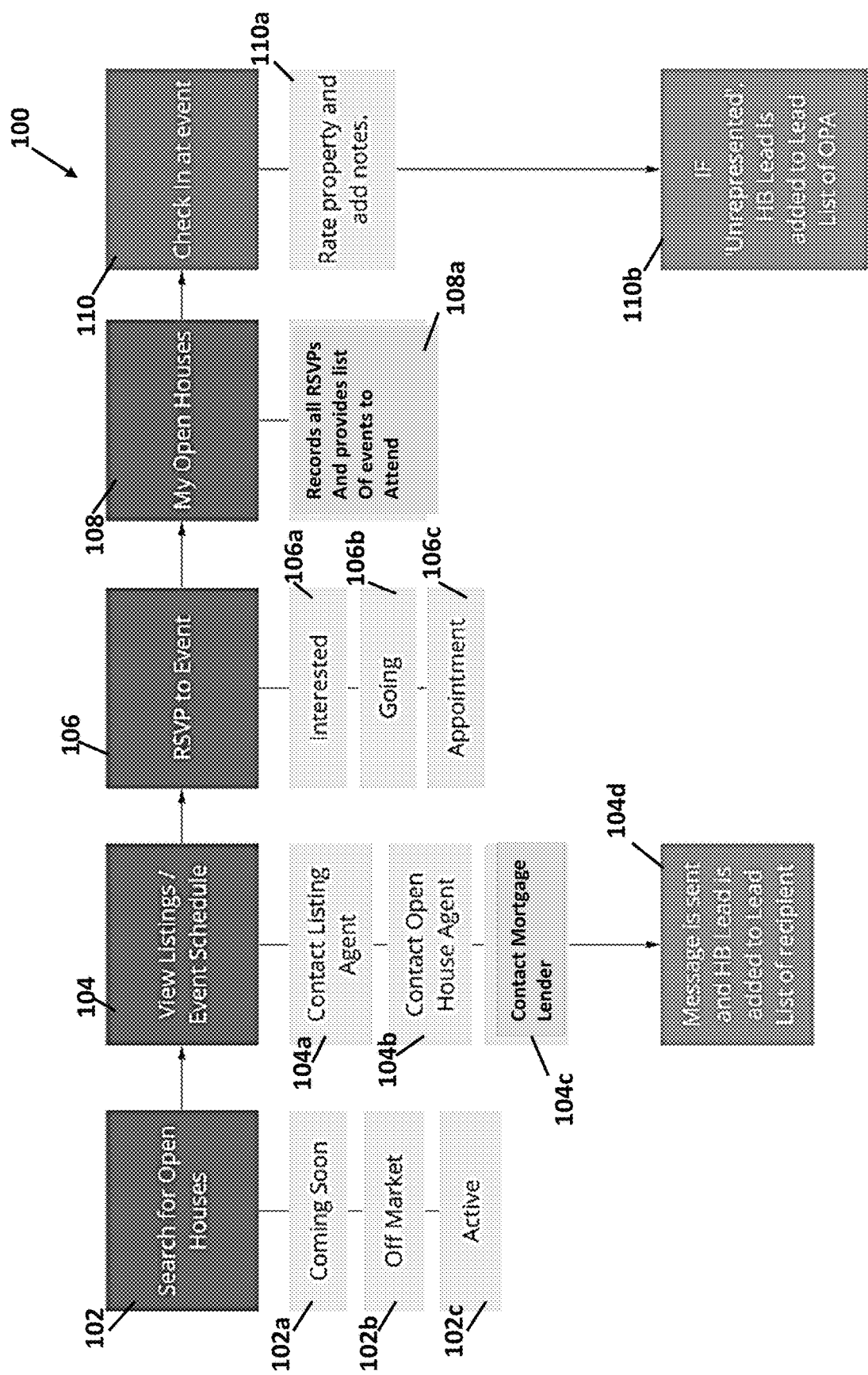
FIG. 1 illustrates an open house real estate system workflow for a home buyer in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Some embodiments include a real estate system, server and method capable of performing one or more realty-related processes or tasks. In some embodiments, the real estate system, server and method can be accessed by one or more users for business and/or transactions related to open house real estate business. In some embodiments, at least some open house related business and/or one or more transactions can be operated by one or more users through one or more user devices coupled to one or more servers of the real estate system, server and method. As used herein, "users" can be buyers (e.g., real estate buyers or prospective real estate buyers), consumers, customers or clients looking for real estate and/or sellers, including, but not limited to real estate agents, real estate brokers, one or more owners of real estate, or sellers operating on behalf of one or more owners. Further, as used herein, a buyer can be a prospective buyer or an actual buyer. Other user types or roles can include an administrative user, a broker, a listing agent, an open house agent, and/or a mortgage lender. As used herein, the terms real estate, property, house, home, and plural equivalents thereof can be used interchangeably.

In some embodiments, the user can engage a platform of the real estate system, server and method using one or more of a desktop computer, a laptop computer, or any fixed, and/or generally non-mobile Internet appliance coupled through the Internet. In some further embodiments, the user can comprise a mobile user engaging the platform of the real estate system, server and method. In some embodiments, the user can use one or more functions of the real estate system, server and method by coupling to a network using any mobile computing device that can be wirelessly coupled to the real estate system, server and method, including, but not limited to, personal digital assistants, cellular phones, mobile phones, or smart phones, pagers, digital tablets, and/or fixed or mobile Internet appliances. In some embodiments, one or more components of the network can include one or more client devices which can be personal computers including for example desktop computers, laptop computers, digital assistants, personal digital assistants, cellular phones, mobile phones, smart phones, pagers, digital tablets, Internet appliances, and other processor-based devices. In other embodiments of the invention, one or more components of the network can include one or more client devices that include virtual reality viewing devices such as virtual or augmented reality headsets, virtual or augmented reality glasses, and the like.

Some embodiments include one or more coupled devices and/or systems for real estate information capture, real estate information storage, real estate information selection, and real estate information display. In some embodiments, the real estate information can include images that can be still and/or moving images. Further, in some embodiments, any of the coupled devices or systems can communicate real estate data and information from or to another coupled device or system using at least one application.

For example, some embodiments include a real estate system, server and method application program interface ("API"). In some embodiments, the real estate system, server and method API can couple to a real estate information display application to perform various functions of the real estate system, server and method. Some embodiments include a digital gateway coupled to the API and configured to provide distributed access to real estate information of at least one property.

In some further embodiments, the real estate system, server and method can process real estate related information from one or more servers and/or databases and/or from one or more users and/or one or more third parties. In some embodiments, the information from one or more servers and/or databases and/or from one or more users and/or one or more third parties, and/or information processed by the real estate system, server and method can be displayed as one or more pieces of real estate information using various conventional communication methods including, but not limited to, textural and/or graphical information, verbal information, and/or synthetic voice information related to open house real estate, open house real estate business, and/or one or more open house real estate transactions. In some embodiments, this communication can relate only to open house real estate, and can provide a direct line of communication to an open house real estate agent. Some further embodiments include a non-transitory, computer readable database of information of at least one real estate professional (e.g., such as a lead real estate agent, open house real estate agent, and/or broker real estate agent).

The following represents a non-limiting summary of the many features and characteristics of the platform. Further details of the real estate system, server and method are presented in the figures and in the accompanying text following the summary.

In some embodiments, the various types of users can include various or different user roles. For example, Table 1 show some user roles and descriptions according to some embodiments.

TABLE 1

User roles and descriptions

| Role | Description/function/access/user-rights |
|---|---|
| Administrator user | Access to Web Application CMS/admin panel |
| | User profiles - Brokers [BR], Listing Agents [LA], and Mortgage Lenders [ML] |
| | Transaction history - recurring monthly, annual memberships & one-time listing fees |
| | Notifications (system level to users) |
| | On-page content management (written content, blog) |
| Home Buyers [HB] user | Users looking to find, attend, and rate open houses. |
| Brokers (BR) user | Master group which binds Listing Agents together. |
| | Brokers use system to see overall inventory of property listings, open houses, and agents. |
| Listing Agents [LA] user | Schedule and manage open house events. |
| | Communicate with other Agents in same Brokerage |
| | Communicate with clients |
| | Save leads from open house events and gather leads from Listing Page Agent Contact Form. |
| | Account Status: 'Free' or 'Paid' accounts based on broker/individual license. |
| Open House Agent [OHA] user | Listing Agents [LA] that have accepted request to host an Event for another |
| | Listing Agent within the same brokerage group. |
| | Access to Leads from 'Events' |
| | Permissions same as [LA] |

As shown in Table 1, in some embodiments, an administrator user can be provided with access to a web application content management system and/or an administrative panel of a real estate system, server and method. In some embodiments, the administrator user can access user profiles, including, but not limited to brokers profiles, listing agent profiles, and mortgage lender profiles. In some embodiments, an administrator user can access transaction history, including recurring monthly, annual memberships, and one-time listing fees. In some embodiments, an administrator user can send and/or receive notifications (e.g., at the system level to users). In some embodiments, an administrator user can provide on-page content management (e.g., such as written content, and/or blog content).

In some embodiments, the real estate system, server and method can provide and/or facilitate home buyer users with access to open houses, attendance at open houses, and/or rating opportunities for open houses, where a prospective home buyer can rate at least one feature or aspect of one or more open houses.

In some embodiments, users who are real estate brokers can comprise a master group which binds listing agents together, and can use the system to see overall inventory of property listings, open houses, and agents. In some embodiments, listing agents can schedule and manage open house events, and/or communicate with other agents in the same brokerage. In some embodiments, listing agents can communicate with clients, and/or save leads from open house events and gather leads from a listing page agent contact form. In some embodiments, their account status can comprise 'free' or 'paid' accounts based on broker/individual license status.

Some embodiments include open house agent users including listing agents that have accepted a request to host an event for another listing agent within the same brokerage group. These users can gain access to leads from 'events' with permissions being the same as listing agents.

In some embodiments of the invention, the real estate system, server and method can enable buyers to search for one or more open houses on a platform dedicated exclusively to open house listings. In some embodiments, open houses can be displayed by the real estate system, server and method once the real estate agent has added it to the multiple listing service (hereinafter "MLS"), or other conventional real estate listing services. In some embodiments, the real estate system, server and method can publish, advertise or connect the open house agent as the point of contact for buyers. In some embodiments, the real estate system, server and method can enable buyers to directly and substantially instantly couple with the listing or "open house agent" via an instant messaging API, and/or via text or email, and/or via other conventional communication methods. In some further embodiments of the invention, the communication can include one or more communications via instant messaging, including, but not limited to, instant text messaging, and/or instant graphical messaging, and/or instant image message, and/or instant video messaging, instant audio or voice messaging, and combinations thereof. In some further embodiments, the real estate system, server and method can publish, or advertise one or more details of the open house represented by the open house agent.

In reference to one or more of FIGS. 1-5, 6A-6C, 7A-7D, 8-9, 10A-10D, 11A-11B, 12 and 13A-13C, in some embodiments of the invention, buyers can assign themselves to a particular real estate agent from a drop-down list. In some embodiments of the invention, if a buyer is working with a real estate agent, their name can be displayed or presented as "represented" to other agents.

Further, in some embodiments of the invention, buyers can save open houses by clicking an icon (e.g., such as an icon marked or described as "Interested") on the home page. In some embodiments of the invention, buyers can be enabled by the real estate system, server and method to "RSVP" for open houses.

In some embodiments of the invention, the real estate system, server and method can enable buyers to choose the most time effective route for them to view their open houses. In some embodiments of the invention, the real estate system, server and method can enable buyers to access this route via the mobile-ready website or a mobile application, or other convention web site interface.

In some embodiments of the invention, via a mobile application of the real estate system, server and method, buyers can arrive at a home, and the real estate system, server and method can automatically tell them that they have arrived with a "Ring In" notification; creating an automatic "Guest Book" for real estate agents to be able to save and refer to after the open house. In some embodiments, the arrival information can be relayed to one or more brokers using the real estate system, server and method.

In some embodiments of the invention, the real estate system, server and method can monitor or access one or more attributes of a prospective buyer. In some embodiments, the attributes can comprise one or more preferences of the prospective buyer related to at least one aspect or feature of a real estate property (e.g., such as a preferred size of property, and/or a preferred number and/or size of bedrooms, and/or a preferred number and/or size of bathrooms, and/or a preferred type of finish, and/or a preferred type of landscaping, and/or a preferred type of neighborhood and/or preferred location, and/or a preferred price or price range etc.).

In some other embodiments of the invention, the attributes can comprise location and/or movement and/or behavior of a prospective buyer. For example, in some embodiments, the attributes can comprise a location, movement, and/or behavior of a prospective buyer prior to visiting an open house event and/or during an open house event. In some embodiments of the invention, some users such as listing agents can be provided with an automated system that can monitor or track open house traffic and feedback with an advanced lead management and tracking tool. In some embodiments, the lead management and tracking tool includes a geo-location tracking of a prospective buyer enabling position and movement tracking of the prospective buyer. In some embodiments, the lead management and tracking tool of the real estate system, server and method can comprise a statistics engine capable of tracking the movement, and/or behavior, and/or preferences of a prospective buyer prior to and during an open house event. For example, in some embodiments, an API of the real estate system, server and method can couple to one or more cameras or other sensors for capturing images of real estate information (e.g., such as one or more images or videos of real estate). In some embodiments, at least some of the real estate data can comprise visual or image data received from or taken from the user (e.g., such as an image or video of the buyer or seller or a device being controlled by the buyer or seller). In some other embodiments, the real estate data can comprise data measured or taken from the buyer or sellers body, including, but not limited to, at least one body or physical appearance image (e.g., such as a facial image), at least one object worn or carried by the user, and/or at least one gesture, and/or at least one portion of an environment of surrounding the user.

In some further embodiments of the invention, the API can comprise a mobile application of the real estate system, server and method capable of monitoring one or more buyer's foot traffic in one or more locations of the home can be monitored, tracked and/or stored. In some embodiments, via a mobile application of the real estate system, server and method, a historical record of a buyer's movement through at least a portion of one or more properties can be stored and/or accessed. In some embodiments, this data can include information regarding which rooms were visited by the buyer, and how long they were in one or more rooms and/or the home, etc. In some embodiments, the buyer's movement can be tracked using geo-tracking. In some other embodiments, the buyer's movement can be tracked by the real estate system, server and method using one or more movement recording or tracking devices including, but not limited to, mobile laptop computers, digital assistants, personal digital assistants, cellular phones, mobile phones, smart phones, pagers, digital tablets, Internet appliances, virtual reality headsets, virtual reality glasses, and other processor-based devices with wireless transceivers. In some other embodiments, the buyer's movement can be tracked by the real estate system, server and method using one or more movement recording or tracking devices installed within the property. In other embodiments, the buyer's movement can be tracked by the real estate system, server and method using one or more movement recording or tracking devices carried by an individual accompanying the buyer (e.g., such as a real estate agent), including, but not limited to, mobile laptop computers, digital assistants, personal digital assistants, cellular phones, mobile phones, smart phones, pagers, digital tablets, Internet appliances, virtual reality headsets, virtual reality glasses, and/or other processor-based devices with wireless transceivers.

In some embodiments of the invention, via the mobile application, buyers can be enabled to provide instant feedback on one or more properties they have visited or toured. In some embodiments of the invention, prospective buyers can be encouraged or enabled to provide a "thumbs up" or positive selection or impression, or a "thumbs down" or negative selection or impression for homes they like or dislike. In some embodiments of the invention, via the mobile application, buyers can be enabled to give more detailed feedback by answering a very short survey of the home. Further, in some embodiments of the invention, via the mobile application, buyers can be enabled to document brief notes regarding one or more open houses. In some embodiments, these notes and their feedback can be saved in their account. In some embodiments, this enables the buyer to return at another time and reference their notes and feedback on all properties that they previously visited or intend to visit again. In some embodiments of the invention, properties are kept in the buyers search until they are sold and/or until the buyer deletes them from their saved homes inventory list. In some embodiments of the invention, once buyers have answered the questions, the application can direct them to their next property, and the process begins again once they have arrived at the next property.

The various embodiments described herein include one or more enabling features for real estate agents. In some embodiments, these features can be specific to real estate agents, and in other embodiments, the features are not specific to real estate agents. In some embodiments of the invention, the real estate system, server and method can provide a website dedicated exclusively to advertising and promoting a real estate agent's open houses. In some embodiments, the site can be dedicated exclusively to their branding, and that of their chosen open house real estate agent. In some embodiments of the invention, the real estate system, server and method can enable real estate agents to be advertised exclusively with their own branding on their open houses where no competing real estate agents represented.

In some embodiments of the invention, the real estate system, server and method can enable real estate agents to add open house listings manually, including those that are not currently on the MLS. Further, in some embodiments, the real estate system, server and method can enable real estate agents to advertise "off market", "pre-MLS", and "coming soon" types of properties. In some embodiments of the invention, the real estate system, server and method can enable real estate agents to set, change or modify the date and/or time, and/or other pertinent information about an open house quickly or substantially in real-time on the Internet.

In some embodiments of the invention, the real estate system, server and method can enable real estate agents to manage an open house inventory that can be managed within a brokerage by providing the brokerage backend management of the site, thus allowing real estate agents to schedule open houses with other real estate agents within their brokerage who have posted homes available to be held open. In some embodiments of the invention, the real estate system, server and method can enable real estate agents to pay a monthly membership fee for access to backend data and for lead management access. In some other embodiments, the real estate system, server and method can be configured so that brokerages pay a monthly membership fee for access to brokerage backend data and management.

In some embodiments of the invention, the real estate system, server and method can enable listing real estate agents to receive phone numbers and email addresses for registered buyers who have saved or shown an interest in the open house via a real estate system, server and method website. In some further embodiments of the invention, the real estate system, server and method can enable real estate agents to be provided with an automated system which tracks open house traffic and feedback with an advanced lead management tool. In some embodiments of the invention, the advanced lead management tool can provide a detailed report of all open house traffic that can be provided to listing real estate agents during and after an open house event. For example, in some embodiments, one or more reports can be generated as an Adobe® "pdf" file and sent directly to their client/seller. Adobe® is a registered trademark of Adobe Systems, Inc.

In some embodiments of the invention, any feedback entered into the site or mobile application can be delivered to a real estate agent's back end management platform for subsequent sharing with their sellers.

In some embodiments of the invention, the real estate system, server and method can enable real estate agents to hold "RSVP Only" open houses in which buyers are encouraged to register before attending. In some further embodiments, the real estate system, server and method can enable real estate agents to hold "Appointment Only" and/or "available for showings" open houses in which buyers are required to make an appointment to see the home. In this instance, agents can advertise an open house without having to visit or wait at the open house during the scheduled hours of the open house. This type of event requires buyers to check into an open house and make an appointment with the agent for a specified time, and allows an agent to remotely control the attendance and traffic flow to an open house. In some embodiments, the real estate system, server and method can enable real estate agents to hold "Appointment Only" and/or "available for showings" open houses located in gated, guard-gated, or other secure communities to allow agents to monitor open house attendees.

In some embodiments of the invention, the real estate system, server and method can enable real estate agents to hold "Broker Open houses" and advertise exclusively to real estate agents and brokers. In some other embodiments of the invention, the real estate system, server and method can enable real estate agents to assign an "Open house agent" to the open house so all communication can go directly to the real estate agent holding the open house.

In some embodiments of the invention, by using a social media API, the real estate system, server and method can enable agents to choose to pay to advertise their open house directly through a social media company (e.g., to a demographic of their choice). For example, in some embodiments, the real estate system, server and method can couple through the social media API to one or more files of a collection of files of the social media site, including, but not limited to image files, HTML files, JavaScript files, and/or CSS files. In some embodiments, the real estate system, server and method can access or update a social media site with text files, graphic files, audio files and/or video files. For example, in some embodiments of the invention, with a Facebook® API, the real estate system, server and method can enable agents to choose to pay to advertise their open house directly to Facebook® to a demographic of their choice. In other embodiments, with a LinkedIn® API, the real estate system, server and method can enable agents to choose to pay to advertise their open house directly to LinkedIn® demographic of their choice. In other embodiments, with a TWITTER® API, the real estate system, server and method can enable agents to choose to pay to advertise their open house directly to one or more TWITTER® accounts. In some other embodiments, with a Snapchat® API, the real estate system, server and method can enable agents to choose to pay to advertise their open house directly to one or more Snapchat® accounts. Snapchat® is a registered trademark of Snap, Inc., Venice, Calif. Instagram® (Instagram is a registered trademark of Instagram, LLC). TWITTER® is a registered trademark of Twitter, Inc., San Francisco, Calif., FACEBOOK® is a registered trademark of Facebook, Inc., Palo Alto, Calif., LinkedIn® is a registered trademark of LinkedIn Corp. of Mountain View, Calif.

Some embodiments of the invention include a graphical user interface (hereafter "GUI") and systems and methods that generate the GUI. In some embodiments, the GUI can comprise one or more display windows, panes, pages, portals, and/or menus that can be organized based upon a one or more information formats, and/or buttons or icons. In some embodiments, any one or more of the information formats, and/or buttons or icons can have one or more attributes or functions. In other words, in some embodiments, any one or more of the displayed information formats, and/or buttons or icons can have one or more control attributes or functions that can be accessed by a user (e.g., by touching a display screen on or adjacent to the GUI category buttons). In some embodiments, any one or more of the GUI category buttons can be used to control a plurality of real estate system attributes or functions using a single or multiple action or input from a user (e.g., such as a buyer, seller, and/or real estate agent or broker).

Some embodiments of the invention include at least one GUI that is rendered on and/or is contained within a touch-screen display of a user's device such as a fixed or mobile device. For example, in some embodiments, a user's device can comprise a touchscreen display or a fixed or mobile device display configured to enable a user to interact with the displayed GUI. In some embodiments, user interactions with the GUI can include contact of at least a portion of the display to initiate or represent an input to the display and/or an input or selection of any information within the display or GUI. For example, in some embodiments, a user, using single, multiple, or repeated physical contact with the display, can initiate one or more functions of the real estate system, server and method. In some embodiments, using one or more portions of the GUI, a user can enter, select, and/or modify one or more variables or attributes, and/or control one or more functions of the real estate system, server and method. For example, in some embodiments, using at least one displayed information, data, button or icon, a user can use the GUI to input or access data or control one or more functions of the real estate system. In some embodiments, the GUI can be used to control a plurality of system of operational variables, attributes, or functions interactively (e.g., in real time or substantially real time).

FIG. 1 illustrates an open house real estate system workflow 100 for a home buyer in accordance with some embodiments of the invention. In some embodiments, a home buyer workflow can include one or more functions for searching for open houses 102. In some embodiments, searchable categories of open house 102 can include, but not be limited to "off market" type properties 102b, "pre-MLS" type properties and/or active properties 102c, and "coming soon" type properties 102a.

In some embodiments, a search home process of the buyer workflow can include a view listing/event schedule process 104. In some embodiments, view listing/event schedule process 104 can include a contact listing agent 104a step, and/or contact open house agent step 104b, and/or contact mortgage lender 104c. Further, in some embodiments, the real estate system, server and method can enable a message to be sent and/or a home buyer lead can be added to a lead list of recipients (process 104d).

In some embodiments, a subsequent step or process of the real estate system workflow 100 can comprise an "RSVP to an event" step 106, where in some non-limiting embodiments, a choice response can be interested 106a, going 106b, and/or appointment 106c. In some further embodiments, a "My Open Houses" process 108 can include a recording of all RSVPs and processing of a list of events to attend (process 108a). In some embodiments, a check-in at an event process 100 can include a process 110a to rate property and add notes. In some embodiments, if unrepresented, a home buyer lead can be added to a lead list of open house agents) using process 110b. In some embodiments of the invention, any one or more of the steps or processes of the real estate system workflow 100 can be included or not included, skipped, or repeated. In some embodiments, any one or more of the steps or processes of the real estate system workflow 100 can be processed by the real estate system, server and method in an alternative order than illustrated in FIG. 1 and/or described above.

Figure 2:
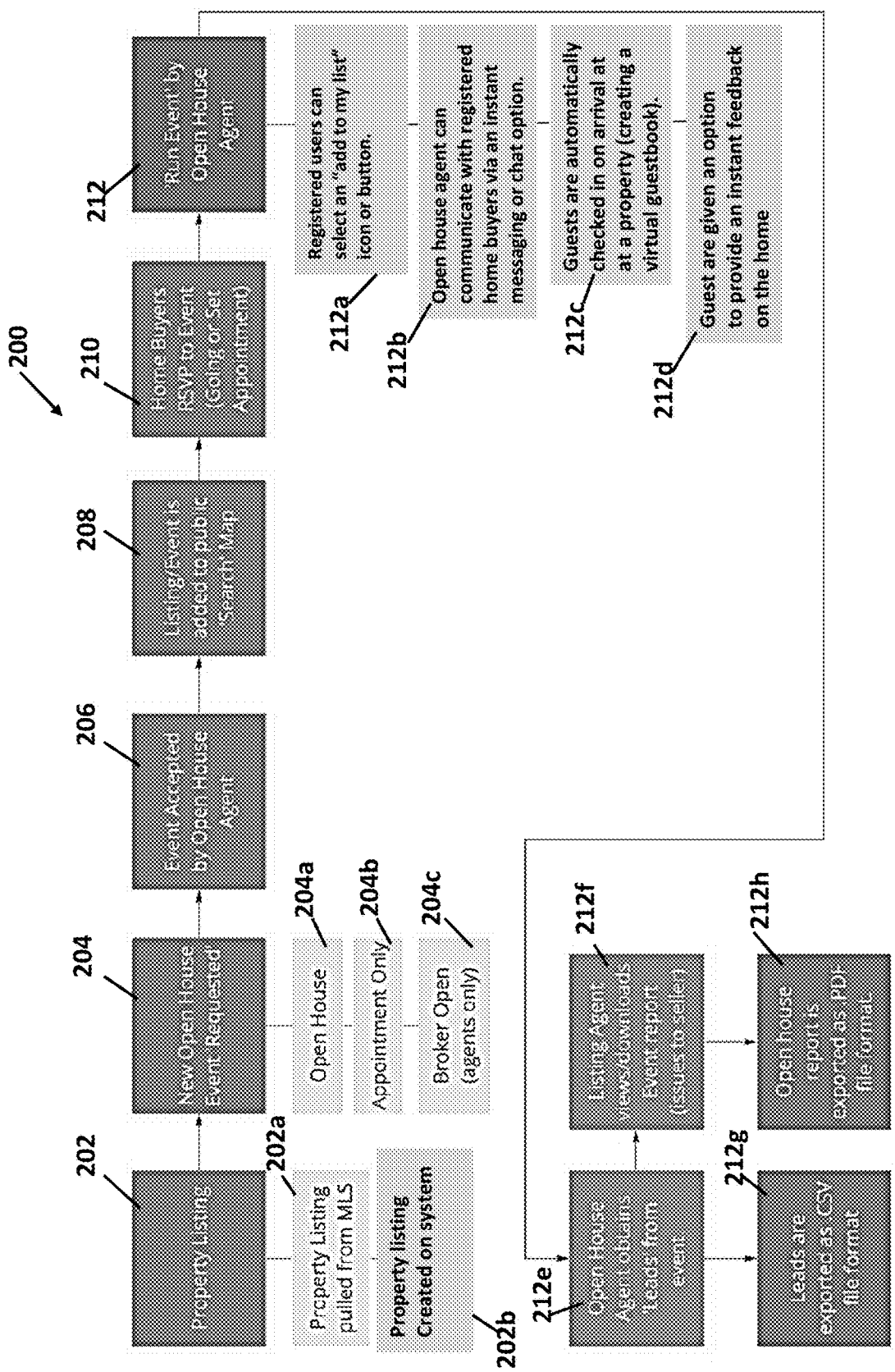
FIG. 2 illustrates an open house real estate system workflow for a listing real estate agent and/or open house real estate agent in accordance with some embodiments of the invention.

FIG. 2 illustrates an open house real estate system workflow 200 for a listing real estate agent and/or open house real estate agent in accordance with some embodiments of the invention. In some embodiments, the open house real estate system workflow 200 can include one or more property listing steps or processes as shown. In some embodiments of the invention, any one or more of the steps or processes of the real estate system workflow 200 can be included or not included, skipped, or repeated. In some embodiments, any one or more of the steps or processes of the real estate system workflow 200 can be processed by the real estate system, server and method in an alternative order than illustrated in FIG. 2. In some embodiments of the invention, a property listing 202 can include a property listing pulled from the MLS (shown as step 202a). In other embodiments, the property listing can be created in the real estate system, server and method (shown as process 202b). In some embodiments of the invention, a subsequent step or process can be a new open house event request (shown as step 204). In some embodiments, the category of open houses can include open house type 204a, appointment only type 204b, or broker open type 204c (i.e. real estate agents only). In some further embodiments, a subsequent step 206 can include an event accepted by open house agent. In some embodiments, a follow-on step 208 can include a listing event is added to a public search map or other public search tool.

In some embodiments of the invention, the open house real estate system workflow 200 can include a "run event" open house process 212, where the open house real estate system, server and method can coordinate and/or run an event. For example, in some embodiments, registered users can review or preview one or more properties and select an "add to my list" icon or button (shown as step 212a). In some further embodiments, an open house agent can communicate with the home buyers registered via an instant messaging or chat option (shown as 212b). In some embodiments, guests can be automatically checked in (creating a virtual guest book) once they have arrived at the home via geo-coding or geo-location on a mobile application of the real estate system, server and method (shown as step 212c). In some embodiments, they can then be given the option to provide an instant feedback on the home (shown as step 212d). Further, in some embodiments of the invention, steps or processes of the open house process can include an open house real estate agent who obtains leads for an event (shown as step 212e), and/or leads are exported (e.g., to a "CSV" file format or other conventional file format) (shown as step 212g). Further, in some embodiments, the listing agent can view or download an event report which can be issued to the seller (shown as step 212f). Further, in some embodiments, an open house report is exported as a .PDF file format, or any other conventional file format (shown as step 212h).

Figure 3:
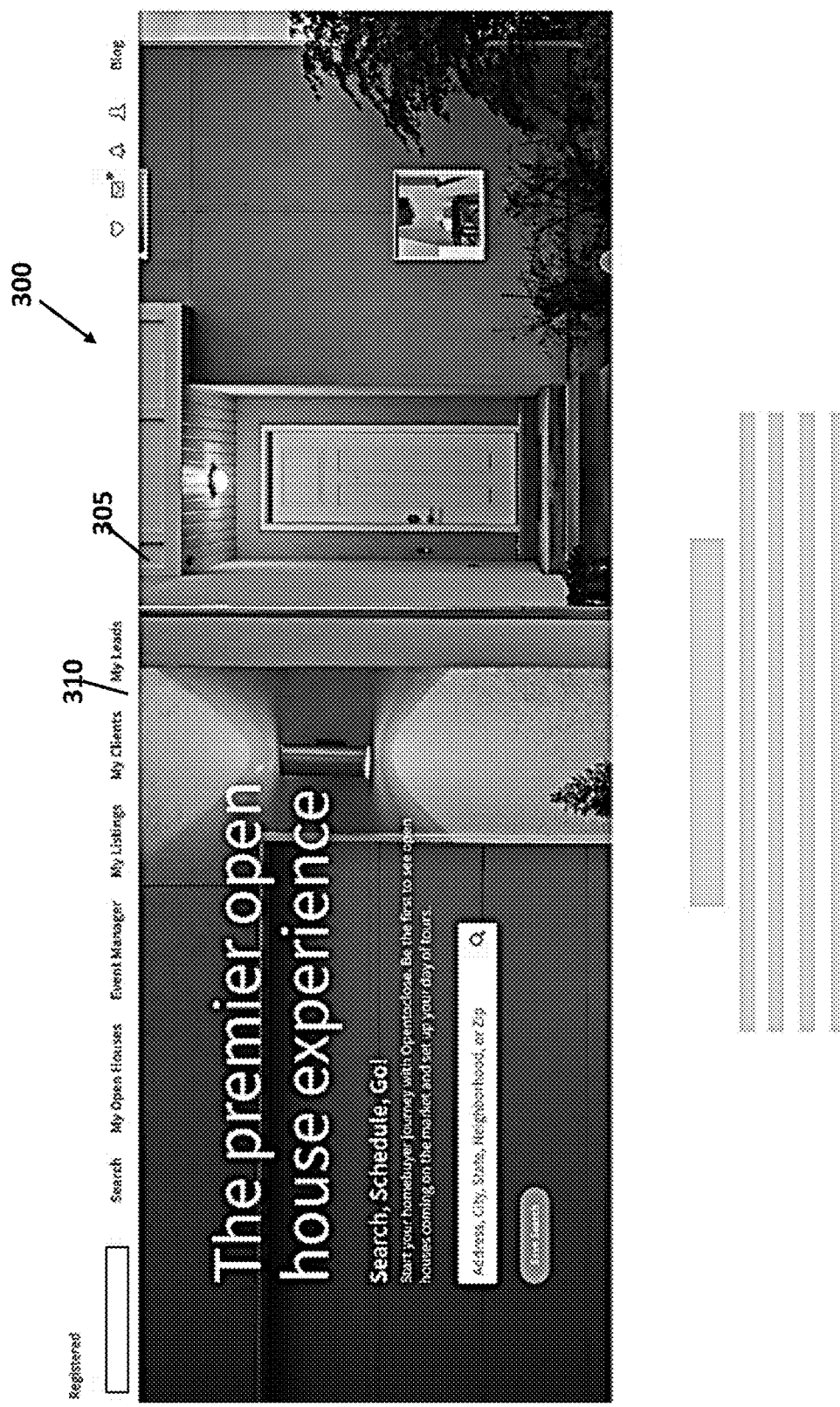
FIG. 3 depicts a web portal display of an open house real estate system in accordance with some embodiments of the invention.

Some embodiments include a real estate system, server and method enabling users (e.g., buyers) to search for open houses on a web-based platform couple to one or more databases comprising open house listings. In some embodiments, in response to one or more searches, one or more open houses can be displayed on a display of the real estate system, server and method once the real estate agent has added it to the MLS or other conventional real estate listing services. In some embodiments, the real estate system, server and method can enable users to directly and/or substantially instantly couple with the listing or open house agent via the web-based platform. For example, FIG. 3 shows a web portal display 300 of an open house real estate system in accordance with some embodiments of the invention. In some embodiments, a user can search by city, state, or zip code, and filters results on a search screen 305 with boundaries set. In some embodiments, the web portal display 300 can include an access or function bar 310 providing access to one or more functions and/or displays of the real estate system, server and method. For example, some embodiments include an access or function bar 310 that includes one or more functions and/or displays including, but not limited to, "search", and/or "My open houses", and/or "event manager", and/or "my listings", and/or "my clients", and/or "my leads".

Figure 4:
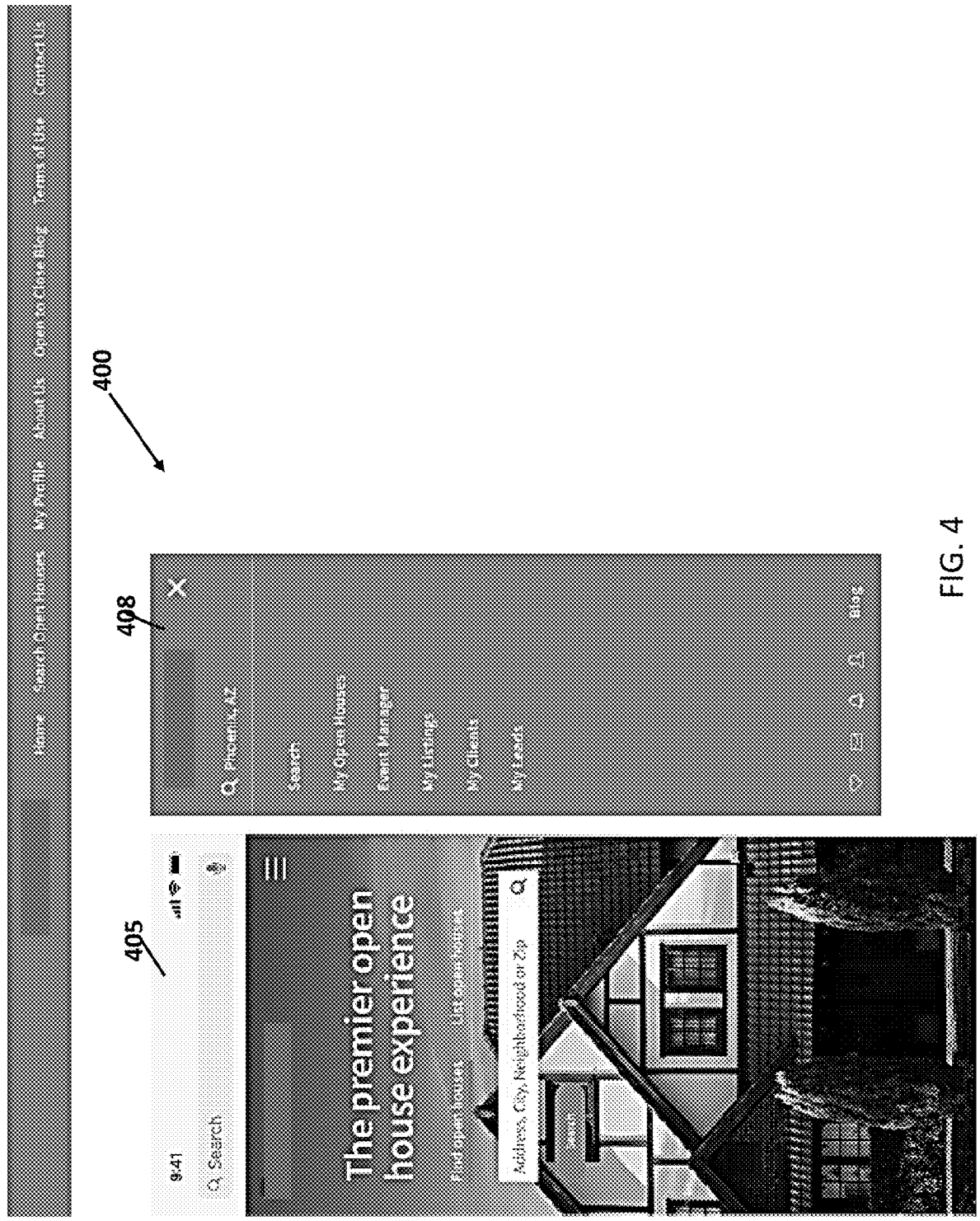
FIG. 4 illustrates a web portal mobile display of an open house real estate system in accordance with some embodiments of the invention in accordance with some embodiments of the invention.

As illustrated in FIG. 3, some embodiments include marketing content, and text/images sections describing benefits of the real estate system, server and method platform. In some embodiments, the GUI can include a display 305 which can comprise a borderless background video and stock video footage. In some embodiments, the display 305 can include a mobile application download through one or more links. In some embodiments, the display 305 can be adjusted or reformatted to fit a user's display, including, but not limited to a desktop computer display, and/or laptop computer display, and/or personal digital assistant display, and/or cellular or mobile phone, and/or smart phone display, and/or digital tablet display, and/or Internet appliance display, and/or virtual reality viewing device display (e.g., a virtual reality headset display, and/or virtual reality glass display, and the like). In other embodiments, the display 305 can be formatted for display on an automobile display. For example, FIG. 4 illustrates a web portal mobile display 400 of an open house real estate system in accordance with some embodiments of the invention. In some embodiments, the web portal mobile display 400 can comprise a search display 405 and/or search display 408.

Figure 5:
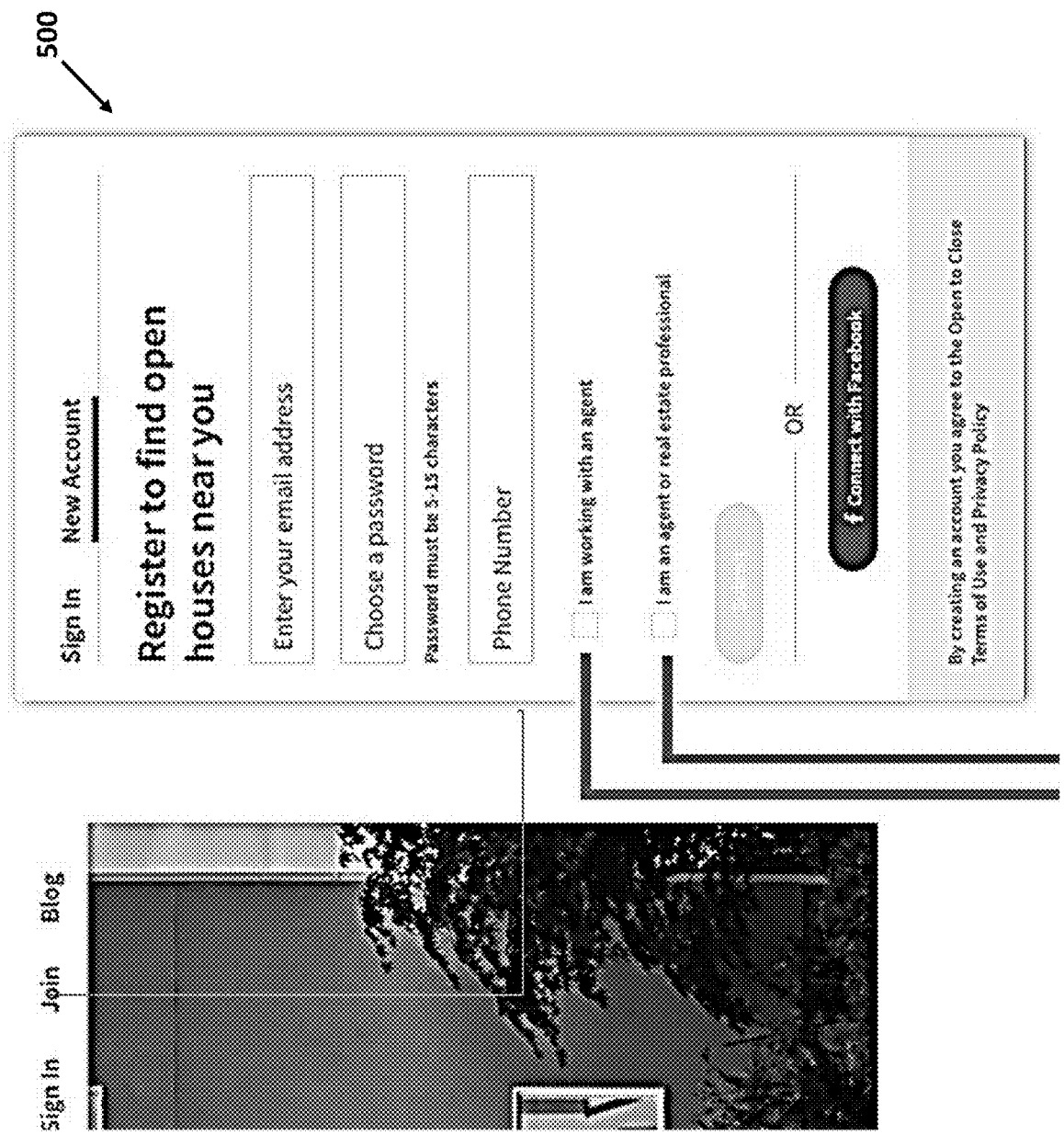
FIG. 5 illustrates sign-in and/or new account portal displays in accordance with some embodiments of the invention.

In some embodiments, a user can join or sign into the real estate system, server and method using a display (e.g., from a display of a user's device). For example, FIG. 5 illustrates a sign-in and/or new account portal display 500 in accordance with some embodiments of the invention. In some embodiments, a user can join or sign into the real estate system, server and method using this non-limiting example display 500. In some embodiments, a user can use the display 500 to access an account and/or create a new account with the real estate system, server and method. In some embodiments, a user can register to find open houses using the display 500. In some further embodiments, a user can be prompted to enter a password using the display 500. In some other embodiments, a user can be prompted to enter a phone number using the display 500. In some embodiments, a user can sign-in as a user working with an agent using the display 500. In further embodiments, a user can sign-in as an agent or real estate professional using the display 500. In some embodiments of the invention, with a Facebook® API, the real estate system, server and method can enable agents to sign-in or access at least a portion of the real estate system, server and method.

Figure 6A:
FIGS. 6A-6C illustrates new account sign-in portal displays in accordance with some embodiments of the invention.
Figure 6B:
Figure 6C:
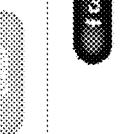

Further, FIGS. 6A-6C illustrate new account sign-in portal displays 600, 625, 650 in accordance with some embodiments of the invention. In some embodiments, the real estate system, server and method can process a real estate agent search based on a user's location or address. In some embodiments, the display can show one or more user-selectable agents (shown as agent 627 in display 625, 650). Other optional responses can include a selection of working with an agent, or identification of the user as an agent.

Figures 7A, 7B, 7C, 7D:
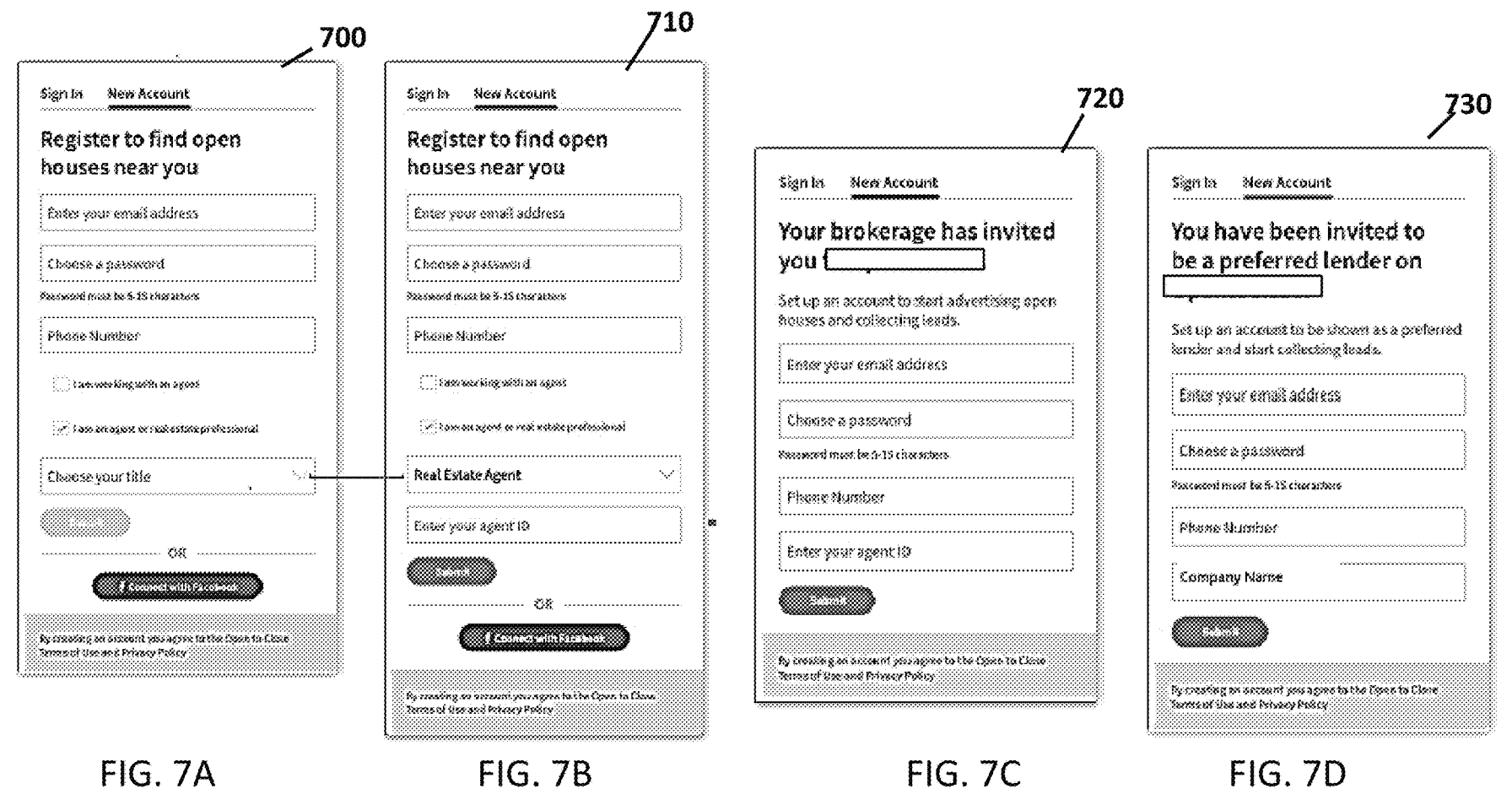

FIGS. 7A-7D illustrate real estate agent sign-in and/or new account portal displays 700, 710, 720, 730 in accordance with some embodiments of the invention. In some embodiments, a real estate agent user can join or sign into the real estate system, server and method using this non-limiting example display. New account sign-in portal displays are shown as non-limiting embodiments, where the real estate system, server and method can process a real estate agent new account set up and/or sign-in. In some embodiments, the user can select real estate agent from a drop-down menu and/or a real estate agent ID as shown in FIG. 7A (by selecting "choose your title" drop-down menu), with "real estate agent" title selected and shown in FIG. 7B. As shown in FIG. 7C, in some embodiments, the real estate system, server and method can process a display 720 including an invitation from a brokerage to a real estate agent user. Further, as shown in FIG. 7D, in some embodiments, the real estate system, server and method can process a display 730 including an invitation to be a preferred lender.

Figure 8:
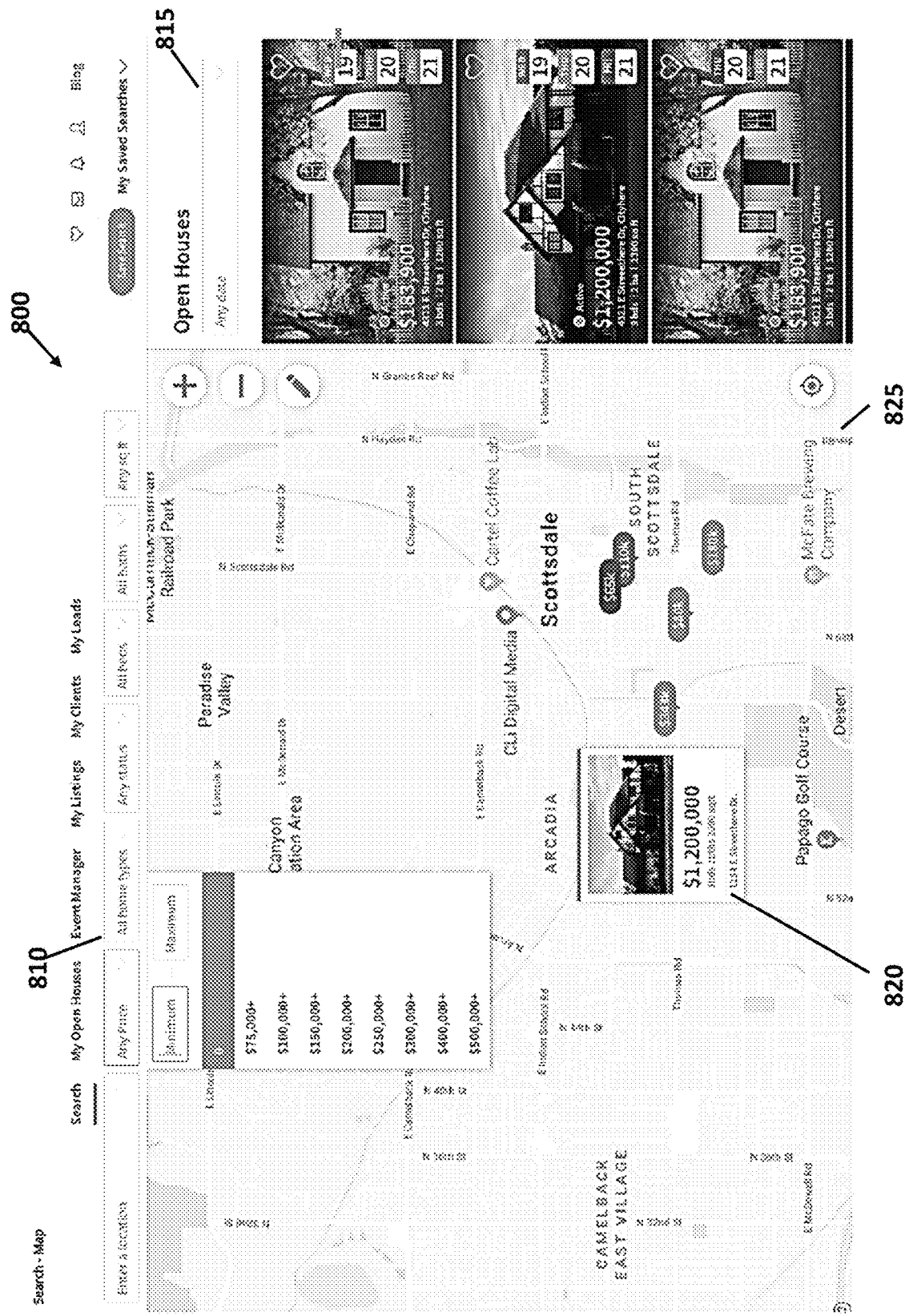
FIG. 8 illustrates a real estate search page in accordance with some embodiments of the invention.

FIG. 8 illustrates a real estate search page 800 in accordance with some embodiments of the invention. As discussed earlier with respect to FIG. 3, in some embodiments, a user can use a search function of the real estate system, server and method to search for one or more open houses, and in some embodiments, the search can be limited or defined by one or more user-definable filters. For example, in some embodiments, a user can search by city, state, or zip code, and filters results on a map screen 825 with boundaries set. In some embodiments, the search results can be filtered by one or more filters, including, but not limited to, a price or price range, a type of real estate, a status, number of bedrooms, number of bathrooms, and/or square footage. Some embodiments include map controls such as zoom, view (automatic/street/satellite), and a draw tool that can be used for a custom shape to redefine search parameters. In some embodiments of the invention, buyers can map their open house routes with their saved list of open houses based on a specific location and the date and time that the homes are being held open.

In some embodiments of the invention, the map display 825 can include one or more prices 820 associated with one or more real estate assets. In some embodiments, the open houses display portion 815 can show one or more open houses of an area of the map display 825. In some embodiments, the map features can allow buyers to create and save open house searches as well display a map with a drivable route of those open houses on any specific day. For example, as shown, in some embodiments, users can search for open houses based on one or more criteria. In some embodiments, map boundaries can be drawn based on search parameters, including, but not limited to city, state, zip code. In some embodiments, other selectable parameters can include, but not be limited to, a price or price range (e.g., such as from a minimum to maximum range), a home type (e.g., such as houses, apartments, townhomes, condos/co-ops, manufactured). In some further embodiments, other selectable parameters can include, but not be limited to, property status, including, but not limited to, active (for sale), coming soon, and off market.

Figure 12:
FIG. 12 illustrates real estate search filtering process in accordance with some embodiments of the invention.

In some embodiments, a display of the real estate system, server and method such as display 800 can be adapted for a mobile device to enable search filtering. For example, FIG. 12 shows an illustration of a real estate search filtering process in accordance with some embodiments of the invention. As shown, in some embodiments of the invention, the display 1200 can comprise user-selectable sub-displays or windows 1205, 1210, 1215, 1220 that can be displayed based as user selection or preference. In some embodiments, a display 1205 can comprise a map display including one or more real estate asset location and/or prices. In some embodiments, a show list function can be used to generate a display 1210 including one or more open house details. In some embodiments, a filter display 1215 can be used to filter open houses as described earlier. Some other embodiments include a hybrid display 1220 including at least a portion of the open house map and one or more open house details.

Figure 9:
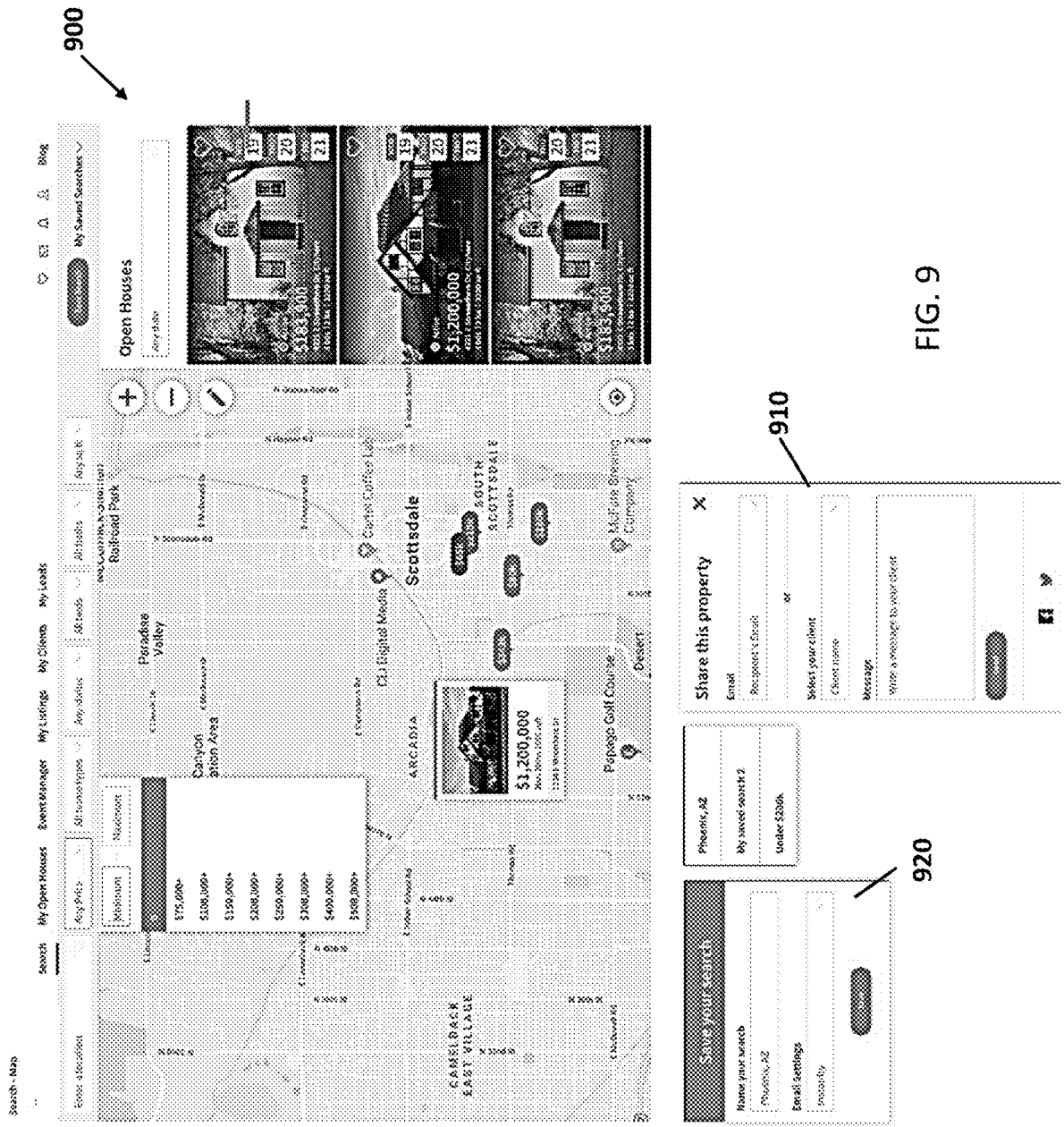
FIG. 9 illustrates a display page of a real estate search in progress in accordance with some embodiments of the invention.
Figure 10C:
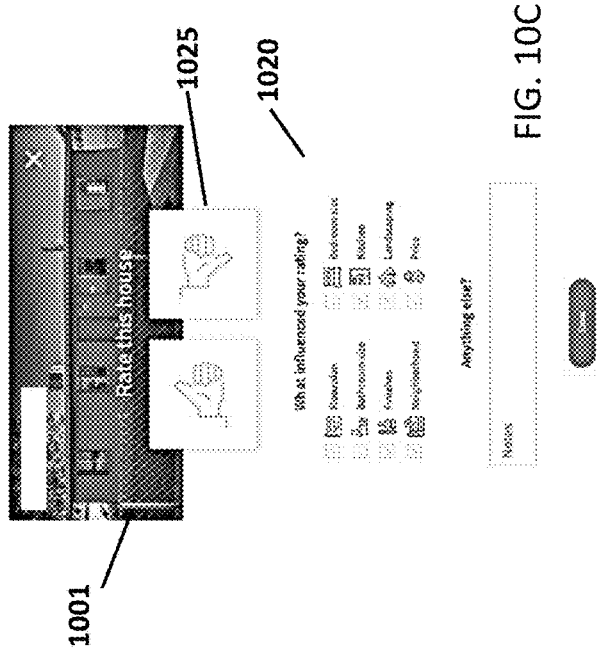
Figure 10D:
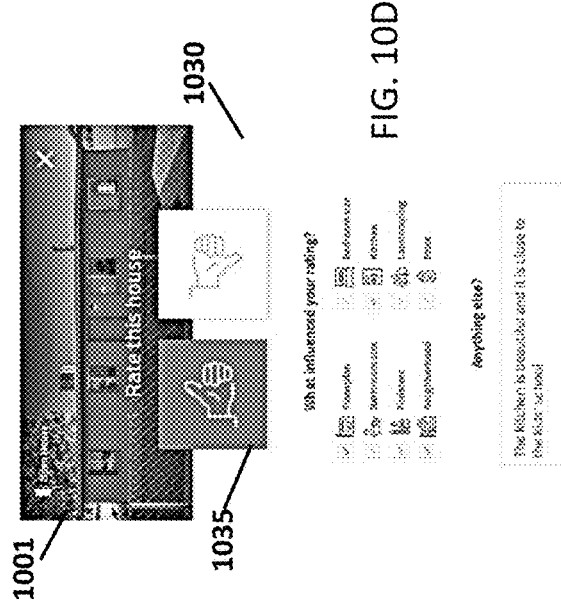
Figure 11:
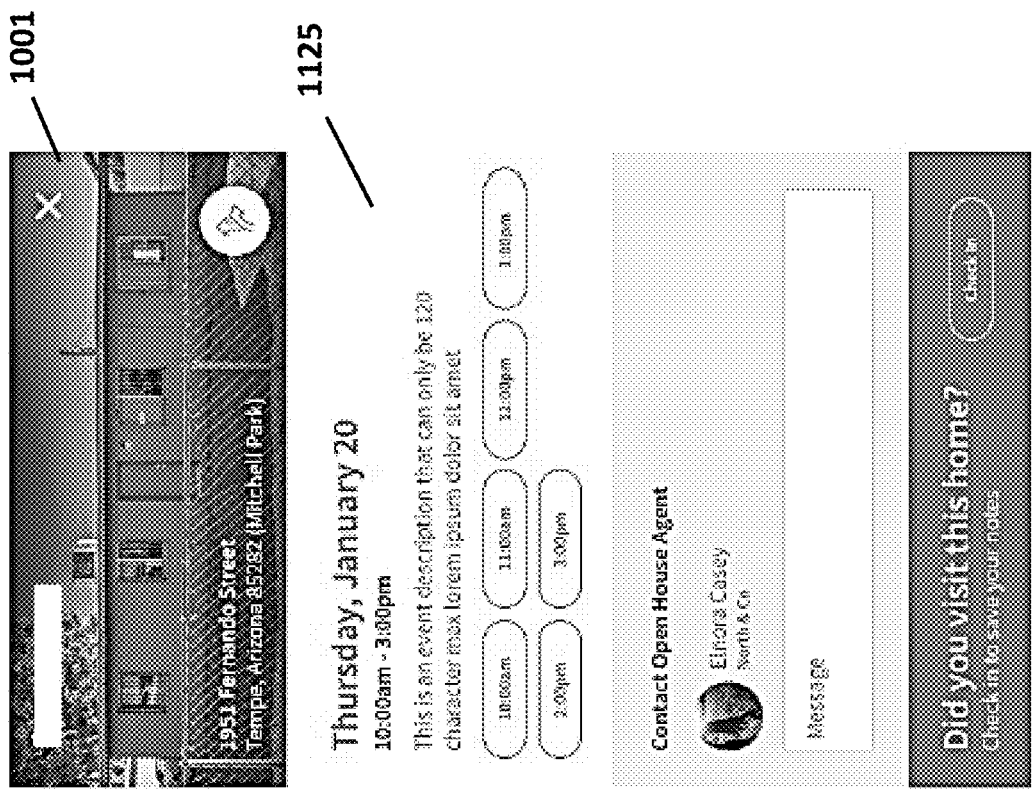
FIG. 11 illustrates event card pop-up display in accordance with some embodiments of the invention.

In some embodiments of the invention, the real estate search page can include an option to save a search and/or access to saved searches ("My Saved Searches"). For example, referring to FIG. 9, illustrating an associated display page of a real estate search in progress in accordance with some embodiments of the invention, some embodiments include a "save your search" window 920. This display page shows non-limiting examples of pop-ups, drop-down menus, or other sub-windows that can provide an opportunity to save searches. Some embodiments include a dropdown menu or list including a list of users "Saved Search" parameters. In some embodiments, the map only displays property listings with an active 'Event' scheduled. In some embodiments, the real estate search page can show property listings overlaid or placed adjacent to the map as a colored dot based on one or more search parameters. In some embodiments, a color of the colored dot can be based on an "Event Type" such as "Broker Open", "RSVP Only", and "Open House". In some embodiments of the invention, if there is more than one event for same property, the real estate system, server and method can schedule a next upcoming event status. In some embodiments, the real estate system, server and method can enable a user to save a property listing organized based on sorting setting such as date of open house. Further, in some embodiments, users can save a search 920, where the user saves user search criteria for easy use in the future.

In some further embodiments, the display can include a property preview image, including, but not limited to, property status, list price, street address, city, number of bedrooms, number of bathrooms, and square footage. In some other embodiments, the display page can include a favorite (checkbox) for saving one or more properties as favorites (e.g., "favoriting"). Some embodiments include event dates access, where a user can click and an "Event Card Pop Up" opens. In some further embodiments, other features include the ability to share one or more properties with other users or with non-users (e.g., such as friends and family) (window 910). In some embodiments, sharing can be through a selection of text, email, Facebook®, Twitter®, Google+®, or other social media such as those discussed earlier.

FIGS. 10A-10D and 11 illustrate event card pop-up displays in accordance with some embodiments of the invention. In some embodiments, the displays can include one or more property views and/or property preview image 1001. In some embodiments, other details can include, but not be limited to, street address, city, directions link, event date and time, and event description 1000. In some embodiments, the pop-up display can include one or more event types, such as open house, broker only, and RSVP only. In some embodiments, an open house can be available to all users, where an 'Interested' button can be used to add an event to "My Open Houses" ('Upcoming' list). For example, in some embodiments, an action button can be displayed that can enable users to specify interested, going, etc., (shown as 1005). In some embodiments, the display can also enable users to pick a time (rsvp only events) (1125 of FIG. 11), and access an open house agent profile. Other options include a contact agent form that can send a message to an open house agent (1010 of FIG. 10B) in some embodiments.

In some further embodiments, a broker open event can be visible exclusively to a listing agent and broker role. In some embodiments, the 'Interested' button can be used to add an event to 'My Open Houses—Upcoming' list. In some further embodiments, an "RSVP only" can include an option where a user must select a time to attend the event, and a listing agent is sent a message with time of appointment selected, and opens a new chat between the buyer and the listing agent. In this instance, an event is added to 'My Open Houses—Upcoming' list. Further, in some embodiments, a user can be sent a notification one hour before time selected on date of event.

In some embodiments, an indicated event status can be pending, confirmed, deleted, or complete. In some embodiments of the invention, the display can include a ratings function. For example, some embodiments include an option for a user to provide or select a rating and/or to add comments or other information. For example, in some embodiments, a "Rate this house" feature 1025 that can be included using a selectable "Positive" (thumbs up) or "Negative" (thumbs down) option. In some embodiments, a displayed or selectable features list including one or more influencing factors for the user's selection of the rating can be shown, including, but not limited to, floorplan, size of bedrooms, size of bathrooms, kitchen, finishes, landscaping, neighborhood, and price (see features list 1020). For example, in reference to FIG. 10D, a selected positive rating 1035 can be accompanied by features list 1030 that includes a selection of user-selected factors influencing the rating 1035.

Figures 13A, 13B, 13C:
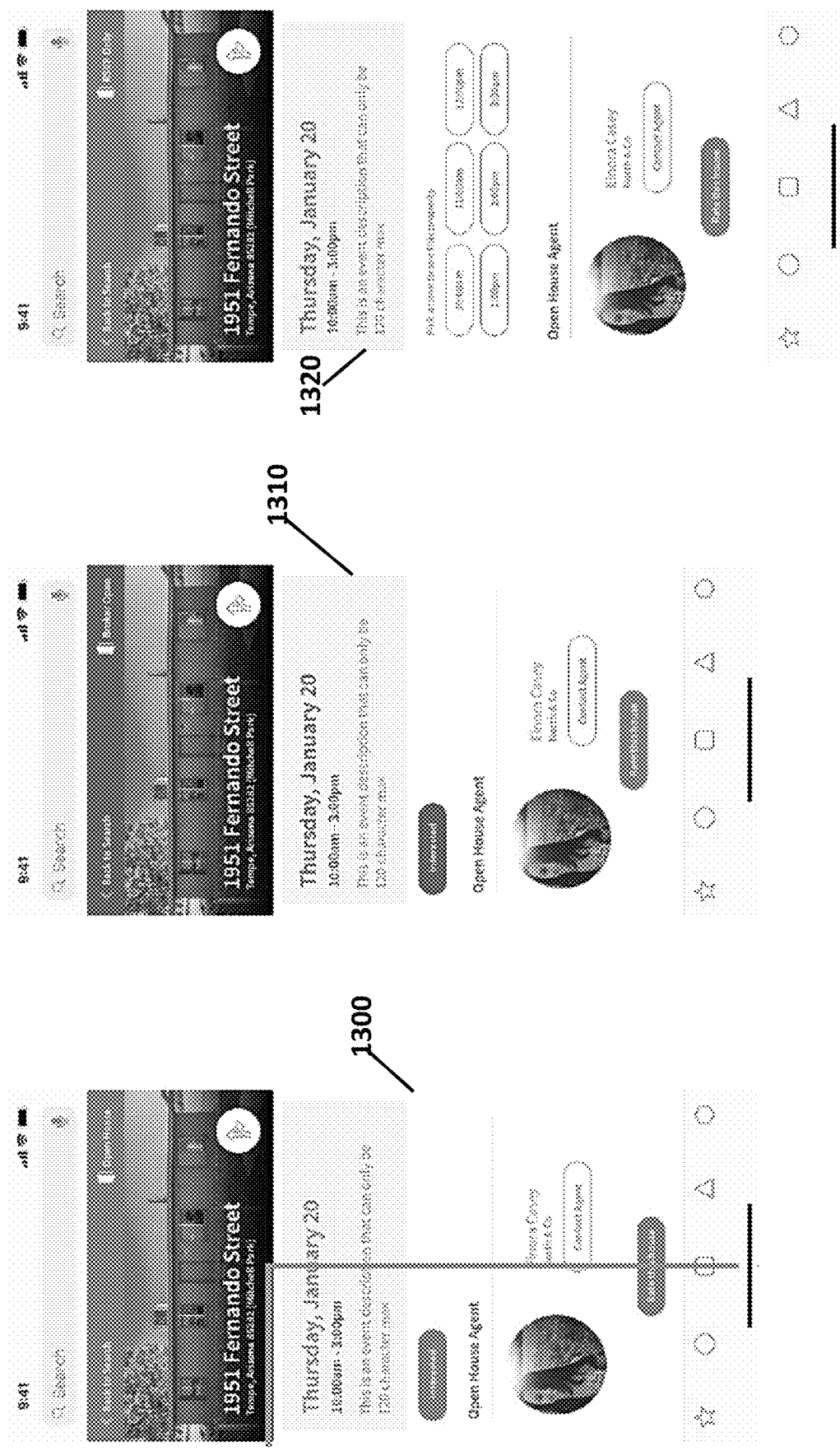
FIGS. 13A-13C illustrate real estate event pop-up displays in accordance with some embodiments of the invention.

A further example is shown in FIGS. 13A-13C, illustrating real estate event pop-up displays in accordance with some embodiments of the invention. For example, display 1300 of FIG. 13A comprises an open house disclosure including a display of an image of real estate and an associated address, an option to select an interest, a rating button, and open house agent information. FIG. 13B illustrates a broker open version 1310 of the display, and FIG. 13C illustrates an RSVP-only version 1320 of the display including a display of selectable time options to view the real estate.

Figure 14:
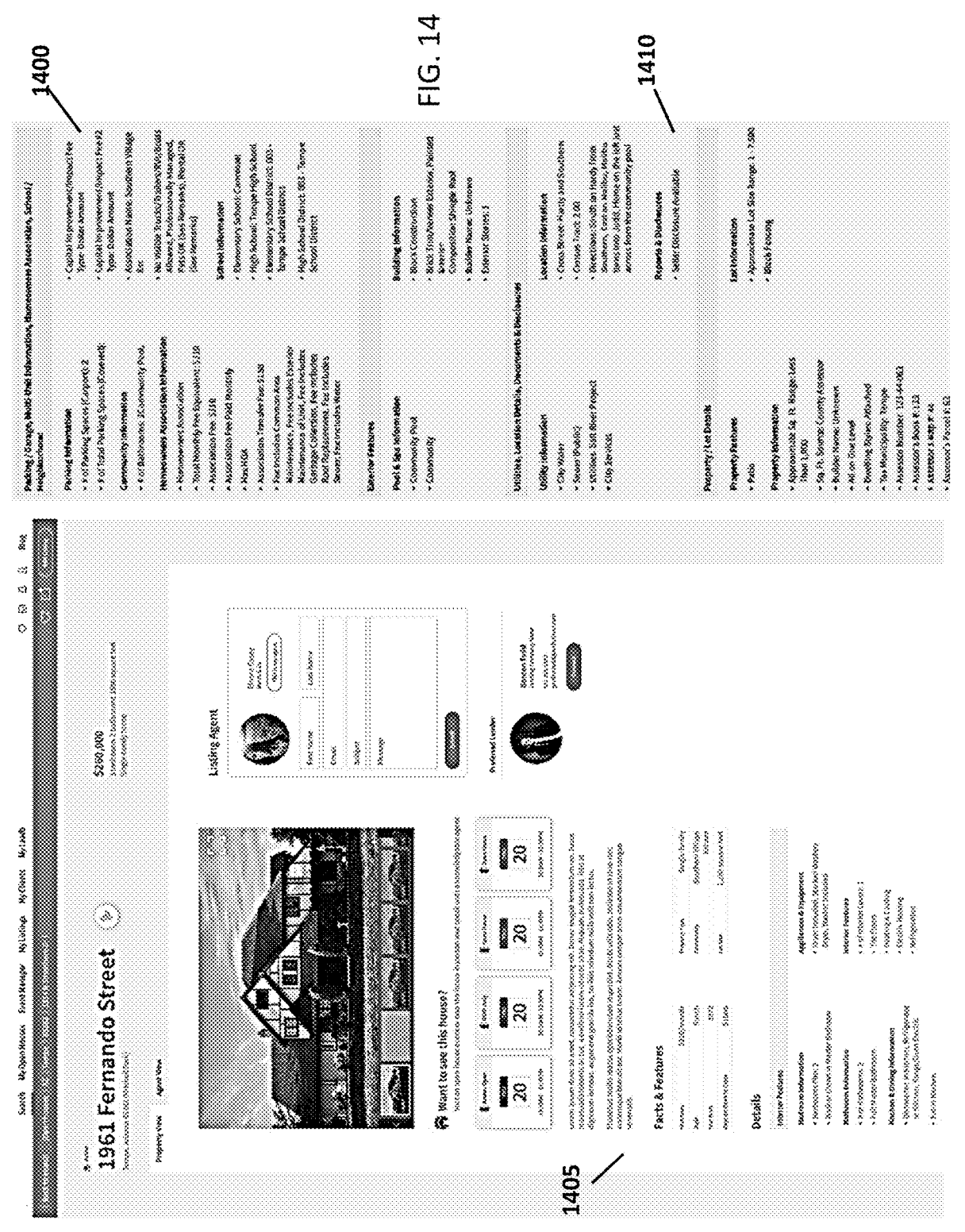

FIG. 14 illustrates a detailed property listing display 1400 in accordance with some embodiments of the invention. In some embodiments, the display 1400 can include listing details 1405 page (number of bedrooms, number of bathrooms, square-footage, etc.), listing statuses, listing agent, mortgage lender, and share/favorite options, and details page 1410. Some options include one or more images of a property such as a feature image, galley of images and/or a video. Some options also include a map preview, street address, city, state, and zip code, property type and status, and price. Other displayed information can include upcoming event schedule, and list of active scheduled open house events in future, and a one-click event pop-up option.

Figure 15:
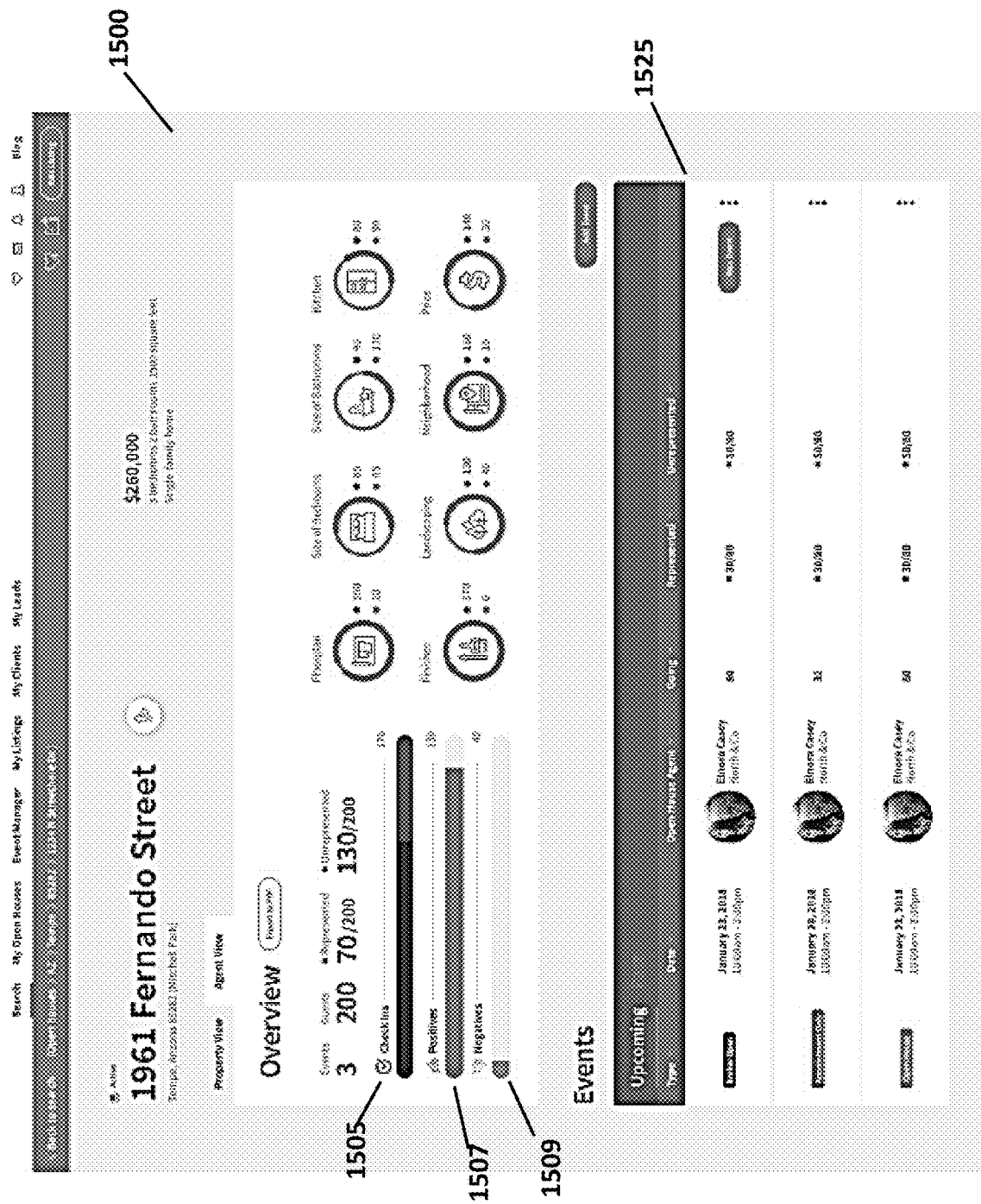
FIG. 15 illustrates a real estate agent view statistics display page in accordance with some embodiments of the invention.

In some embodiments of the invention, the real estate system, server and method can process and display one or more open house real estate statistics related to one or more properties or open house events. In some embodiments, one or more of the statistics can be displayed on a statistics dashboard tailored to a real estate agent. For example, FIG. 15 illustrates a real estate agent view statistics display page 1500 in accordance with some embodiments of the invention. In some embodiments, the display page 1500 can comprise statistics including the number of events, the number of guests, the number of represented guests, the number of unrepresented guests. Further embodiments can include the number of check-ins 1505, and one or more ratings, including the number of positives 1507, and/or the number of negatives 1509. Some further embodiments also include a rating display of the positive and negatives as a function of feature or aspect of the property, including, but not limited to, floorplan, size of bedrooms, size of bathrooms, kitchen, finishes, landscaping, neighborhood, and/or the price. In some embodiments of the invention, the display further includes a listing of events 1525, including a selectable listing of upcoming and past events. In some embodiments, at least some of the listings of past events include data that is used to create one or more statistics of the display page.

Figure 16:
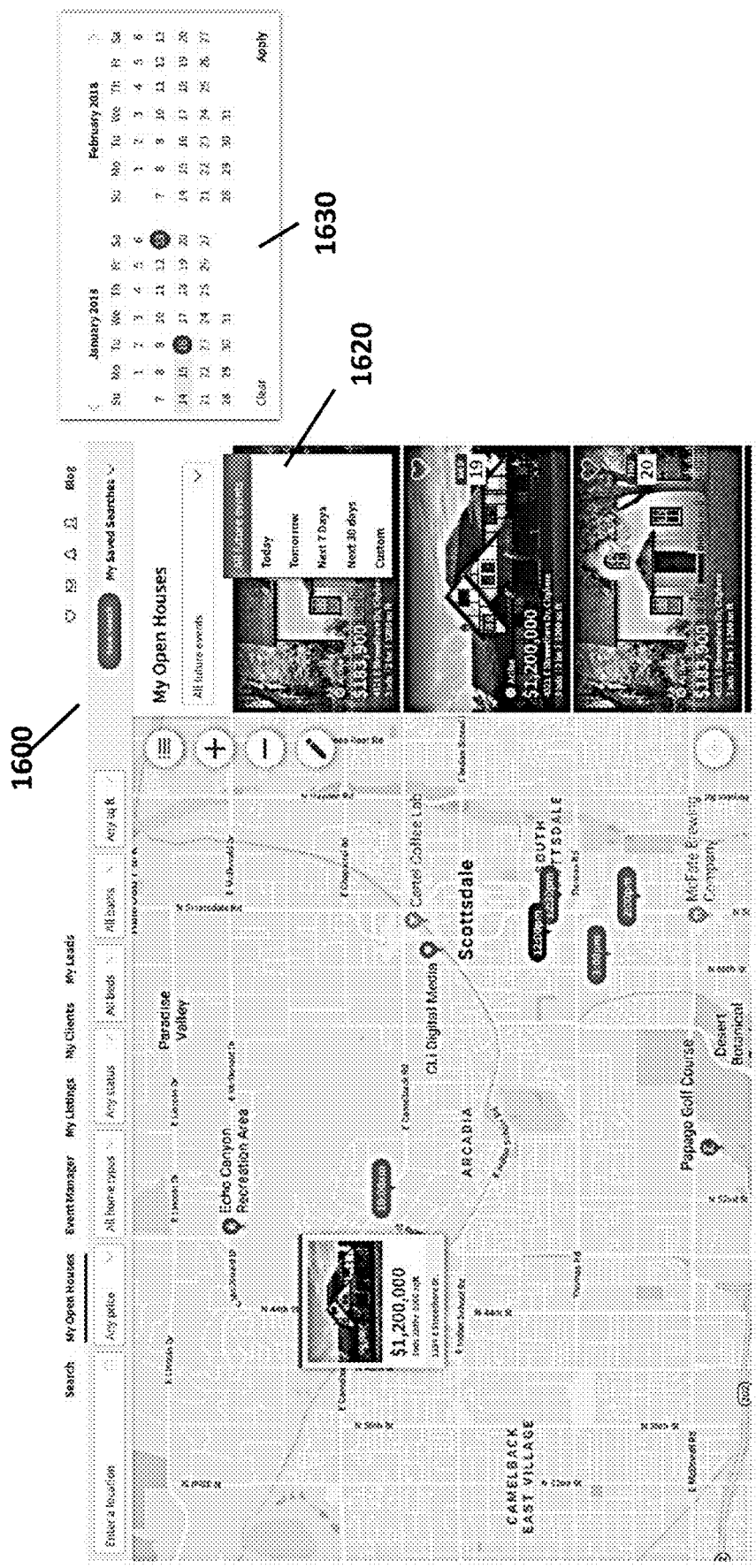
FIG. 16 illustrates a "my open houses" map display in accordance with some embodiments of the invention.

In some embodiments, the real estate system, server and method can display a display map configured with a drop-down menu or other conventional selection tool that enables a filtering of any display results for open house events. For example, FIG. 16 illustrates a "my open houses" map display 1600 in accordance with some embodiments of the invention. Further, in some embodiments, the "my open houses" map display 1600 can include a search function to search by one or more limiting parameters, including, but not limited to a date range. For example, in some embodiments, the display can include a display map configured with a drop-down menu or other conventional selection tool 1620 that enables a filtering of any display results for open house events by all future events, events today, events tomorrow, events in 10 days, events in 30 days, or events in a custom time period. In some embodiments, the display includes a pop-up calendar 1630 for date selection.

Figure 17:
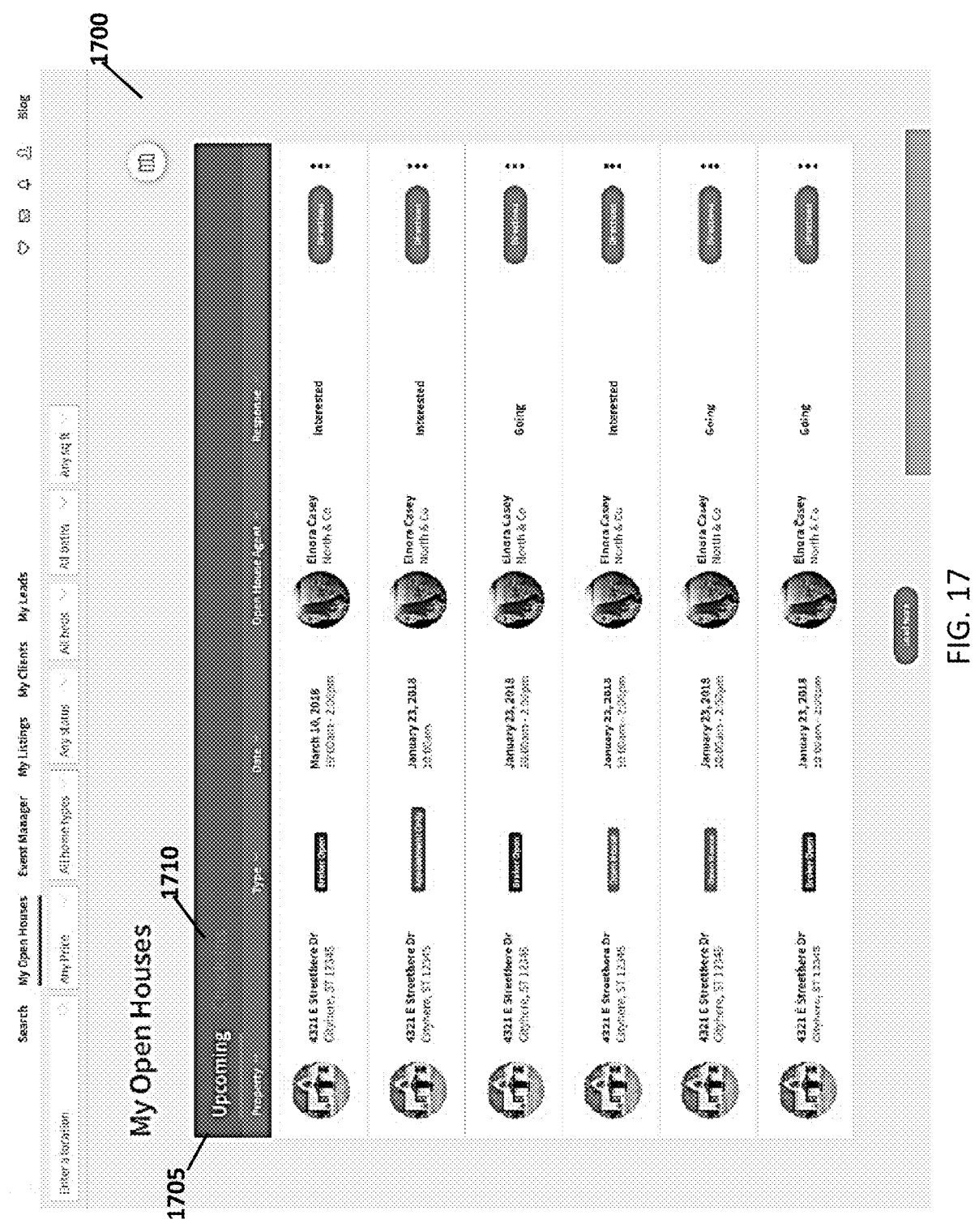

FIG. 17 illustrates a listing/event details display page 1700 in accordance with some embodiments of the invention. In some embodiments, the display page 1700 can include upcoming open houses list 1705 including a display of the property address and thumb-nail image, property type, event data and time, open house agent, indicated response (i.e., from a potential buyer), and a directions link. In some embodiments, the open house display page 1700 can be filtered by location, price, type, status, bedrooms, bathrooms, and area. Further, in some embodiments, any listing can include an open house agent contact information and image, and/or access to check-in information 1710.

Figure 18:
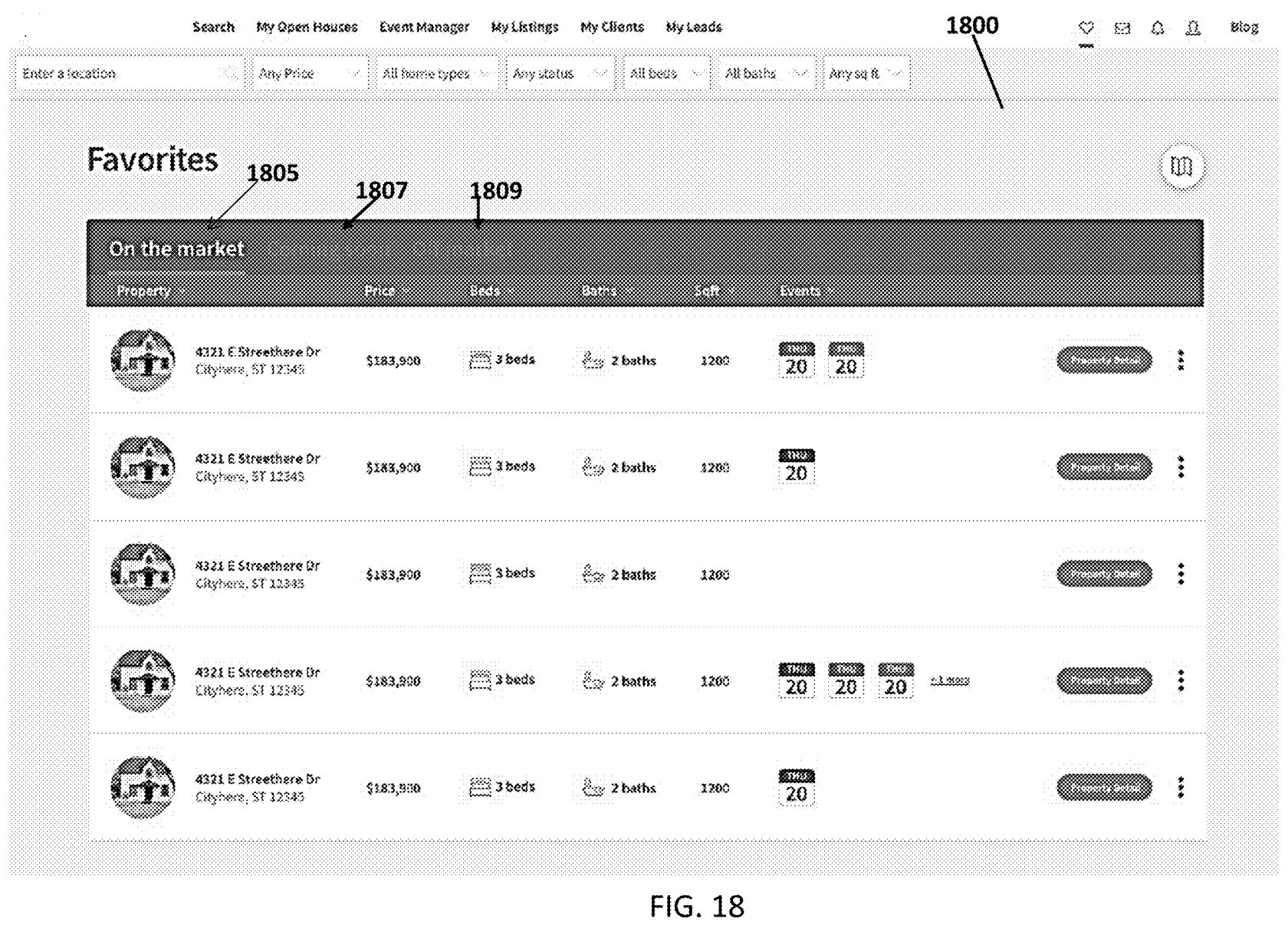

FIG. 18 illustrates a favorites display page 1800 in accordance with some embodiments of the invention. In some embodiments, variations of the display page 1800 can include an on the market display (shown as 1805), coming soon display (page option 1807), and off the market display (page option 1809). In some embodiments, the display page 1800 can include a display of property including a thumb-nail image and address, a price, bedrooms, bathrooms, and square footage. In some embodiments, event dates or times can be shown for one or more listed properties. In some embodiments, a property details link can be included to enable display of further property details.

Figure 19:
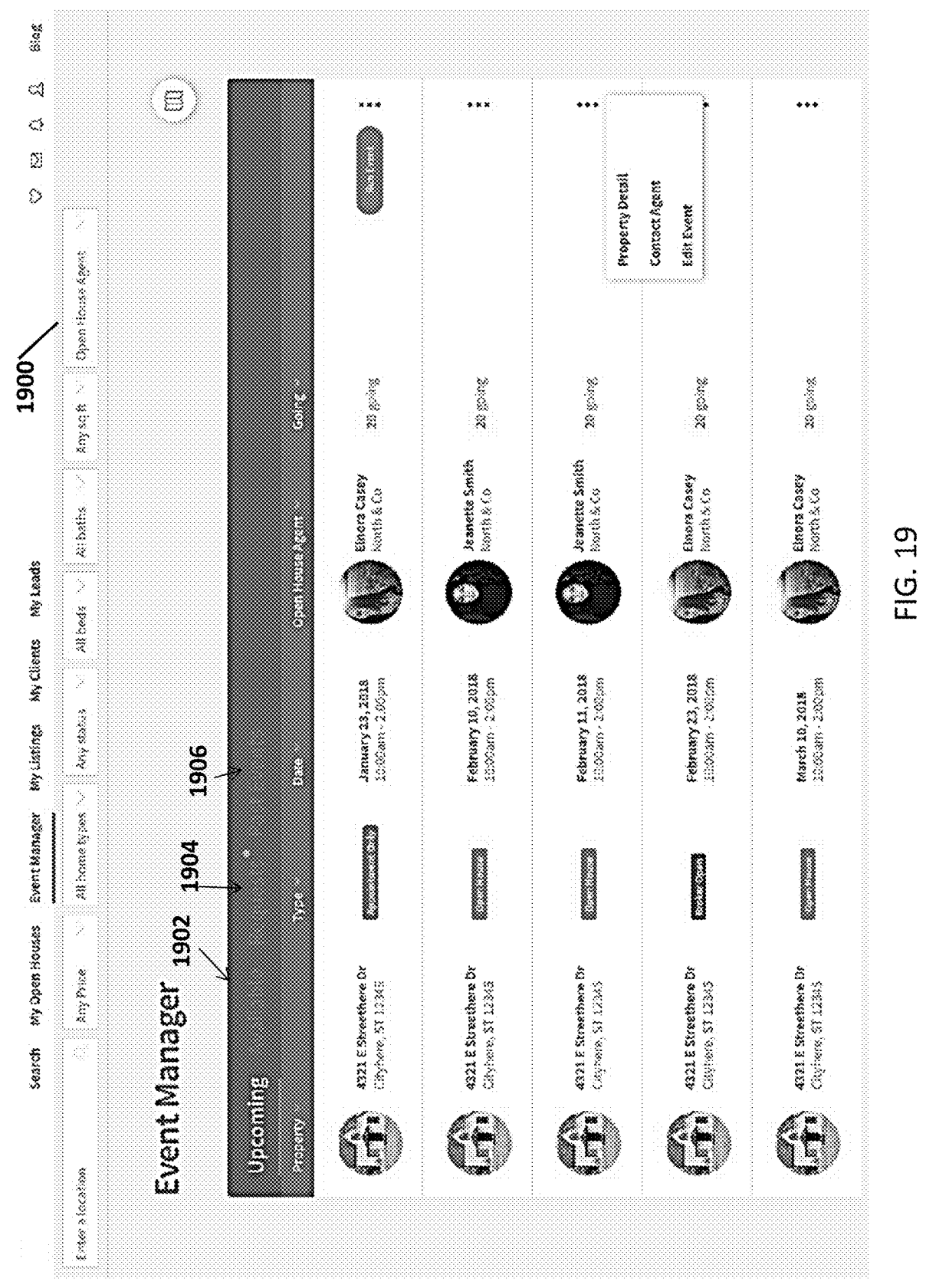

FIG. 19 illustrates an upcoming event manager display page 1900 in accordance with some embodiments of the invention. In some embodiments, variations of the display can include upcoming events (shown), available 1902, requests 1904, and past events 1906. In some embodiments, the display page 1900 can include a display of property including a thumb-nail image and address, and a property type designation. In some embodiments, event dates or times can be shown for one or more listed properties. In some embodiments, the display can show information related to an open house agent for the property or event. Further, some embodiments include "going" information. In some embodiments, a "run event" link can be included to a launching of an event.

Figure 20:
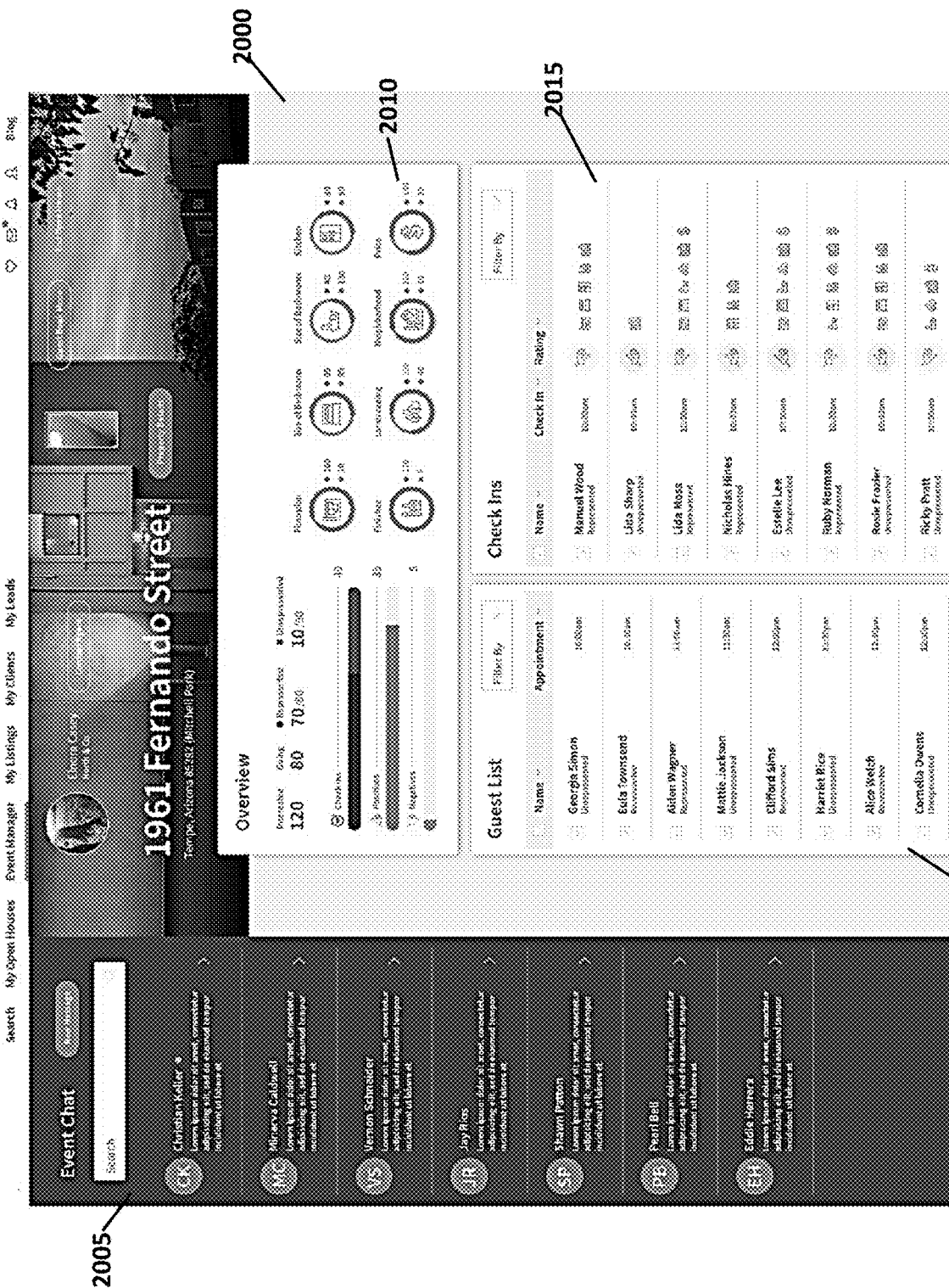
FIG. 20 illustrates an event run tool display page in accordance with some embodiments of the invention.

FIG. 20 illustrates an event run tool display page 2000 in accordance with some embodiments of the invention. In some embodiments of the invention, the real estate system, server and method can display details related to an event substantially in real time (i.e., while the event is occurring). In some embodiments, the display can comprise statistics 2010 including the number of events, the number of guests, a guest list 2020, the number of represented guests, the number of unrepresented guests. Further embodiments can include the number of check-ins 2015, and ratings including the number of positives and the number of negatives. Some further embodiments also include a display of the positive and negative ratings as a function of feature or aspect of the property, including, but not limited to, floorplan, size of bedrooms, size of bathrooms, kitchen, finishes, landscaping, neighborhood, and/or the price. In some further embodiments, the display can also include a chat display window 2005 configured to enable creation of a message for communications between one or more users, including between one or more real estate agents, and one or more buyers.

Figure 21:
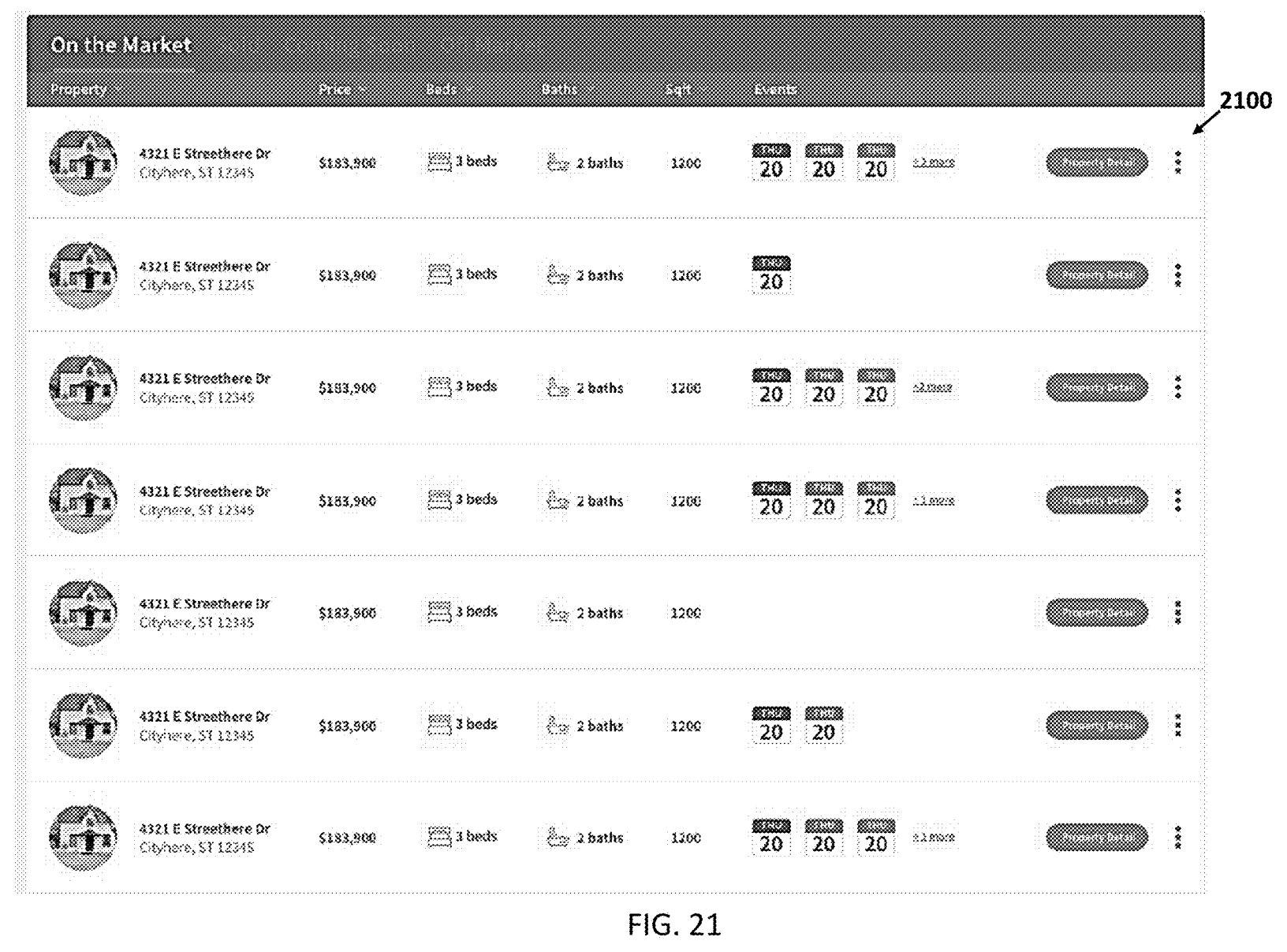

FIG. 21 illustrates an on the market my listings display page 2100 in accordance with some embodiments of the invention. In some embodiments, variations of the display page 2100 can include an on the market display (shown), sold display, coming soon display, and off the market display. In some embodiments, the display page 2100 can include a display of property including a thumb-nail image and address, a price, bedrooms, bathrooms, and square footage. In some embodiments, event dates or times can be shown for one or more listed properties. In some embodiments, a property details link can be included to enable display of further property details.

Figure 22:
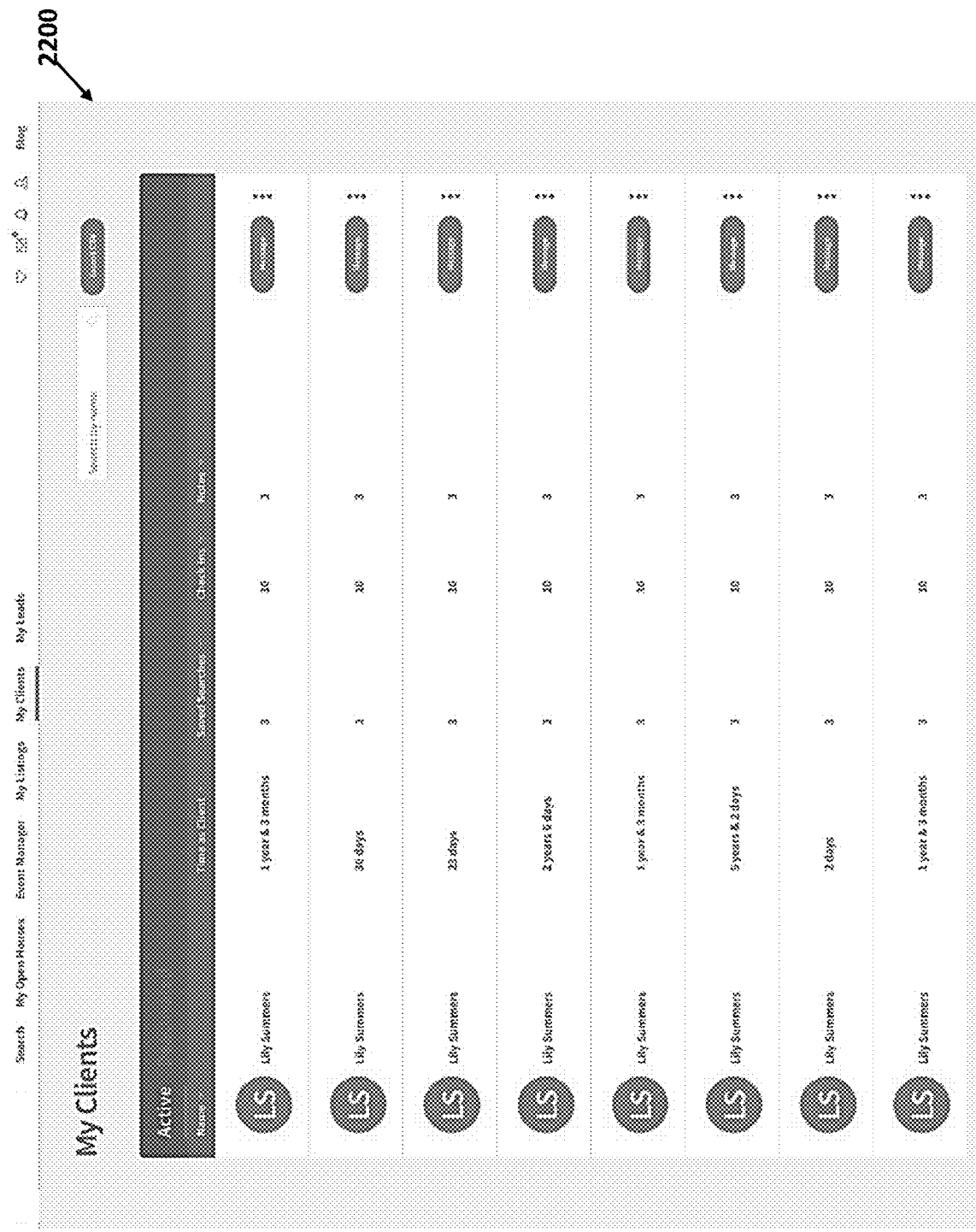
FIG. 22 illustrates a "my clients" display page in accordance with some embodiments of the invention.

In some embodiments, the real estate system, server and method can compile and display a client information page including active and deactivated clients. For example, FIG. 22 illustrates a "my clients" display page 2200 in accordance with some embodiments of the invention. In some embodiments, the display can include a listing of a client's name, and how long they have been a client. Some embodiments also include the number of saved searches, check-ins, and notes. In some embodiments, a message link can be included to enable messaging of a client.

Figure 23:
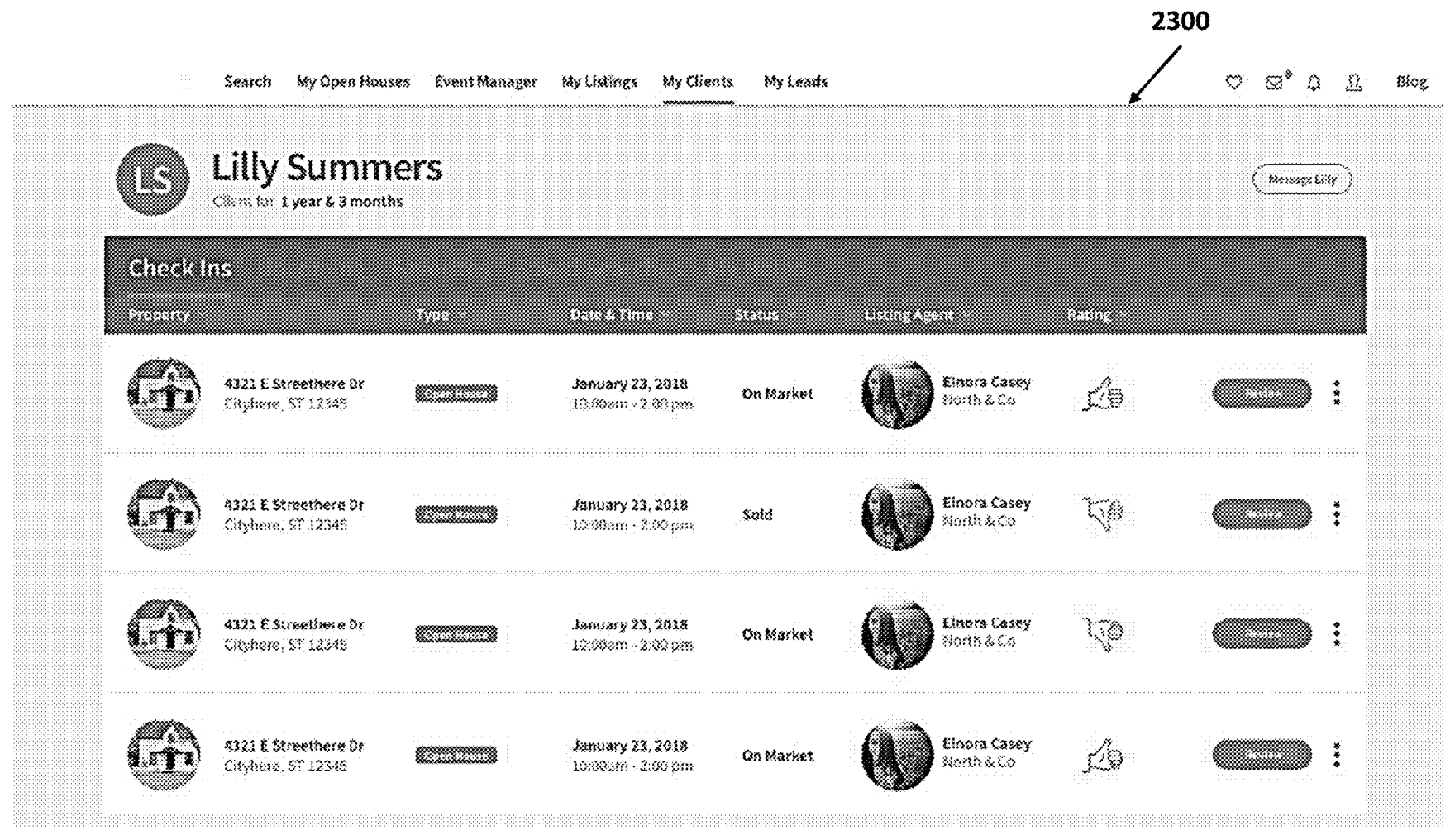

In some embodiments, further client details can be displayed for check-ins, upcoming events, favorites, saved searches, and my notes. For example, FIG. 23 illustrates a client profile display page 2300 in accordance with some embodiments of the invention. In some embodiments, the display can include a display of a client "check-ins" including, but not limited to, event property and property details, type of event (e.g., such as open house), date and time, and status (e.g., on market, sold, etc.). Further information can include listing agent information (e.g., such as image and contact information or broker association), and any client rating for an event or property.

Figure 24:
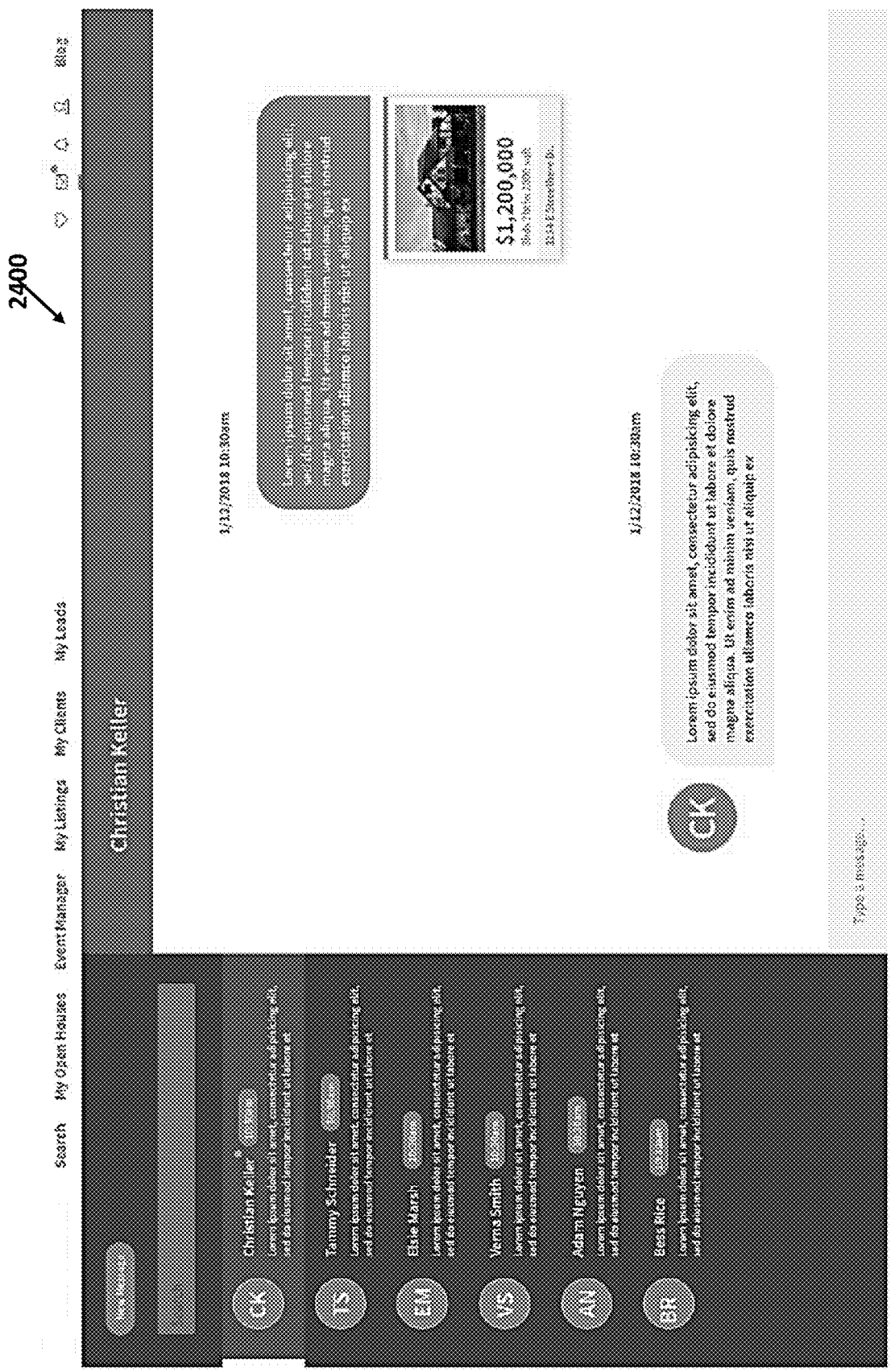
FIG. 24 illustrates a messaging display in accordance with some embodiments of the invention.

Some embodiments enable a dedicated messaging window. In some embodiments, the real estate system, server and method can enable users (e.g., such a real estate agents and buyers) to couple directly and substantially instantly with instant messaging, via text or email within a dedicated window. For example, FIG. 24 illustrates a messaging display 2400 in accordance with some embodiments of the invention. In some further embodiments of the invention, the communication can include one or more communications via instant messaging, including, but not limited to, instant text messaging, instant graphical messaging, instant image message, and/or instant video messaging, instant audio or voice messaging, and combinations thereof.

Figure 25:
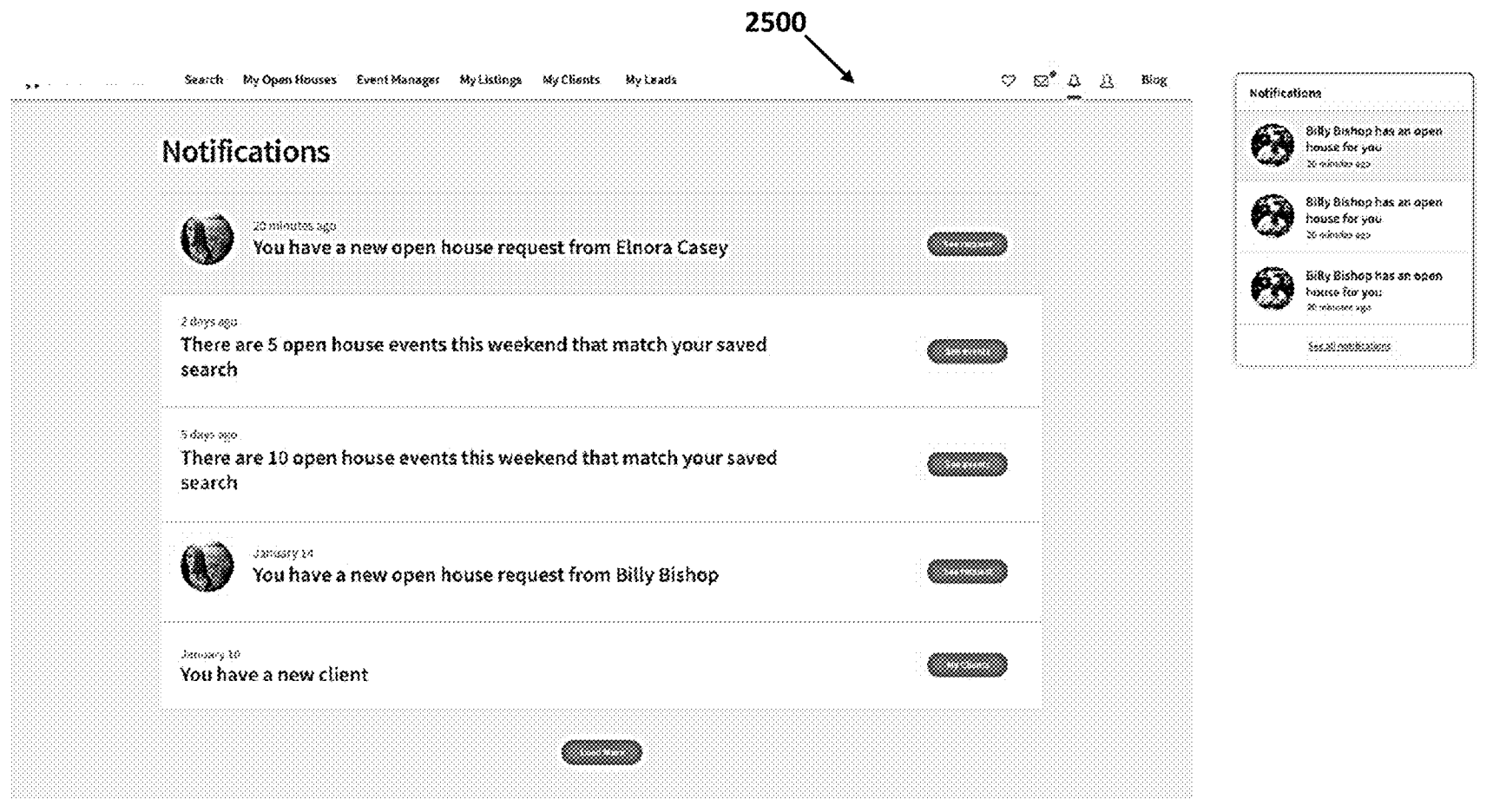

In some embodiments of the invention, the real estate system, server and method can provide a notifications page display including one or more notifications related to open houses and/or clients. For example, FIG. 25 illustrates a notification display page 2500 in accordance with some embodiments of the invention. In some embodiments, the notifications page display can include alerts concerning one or more notification events. Some embodiments include information about events, requests for open house events, and client updates (e.g., such as a new client notification).

Figure 26:
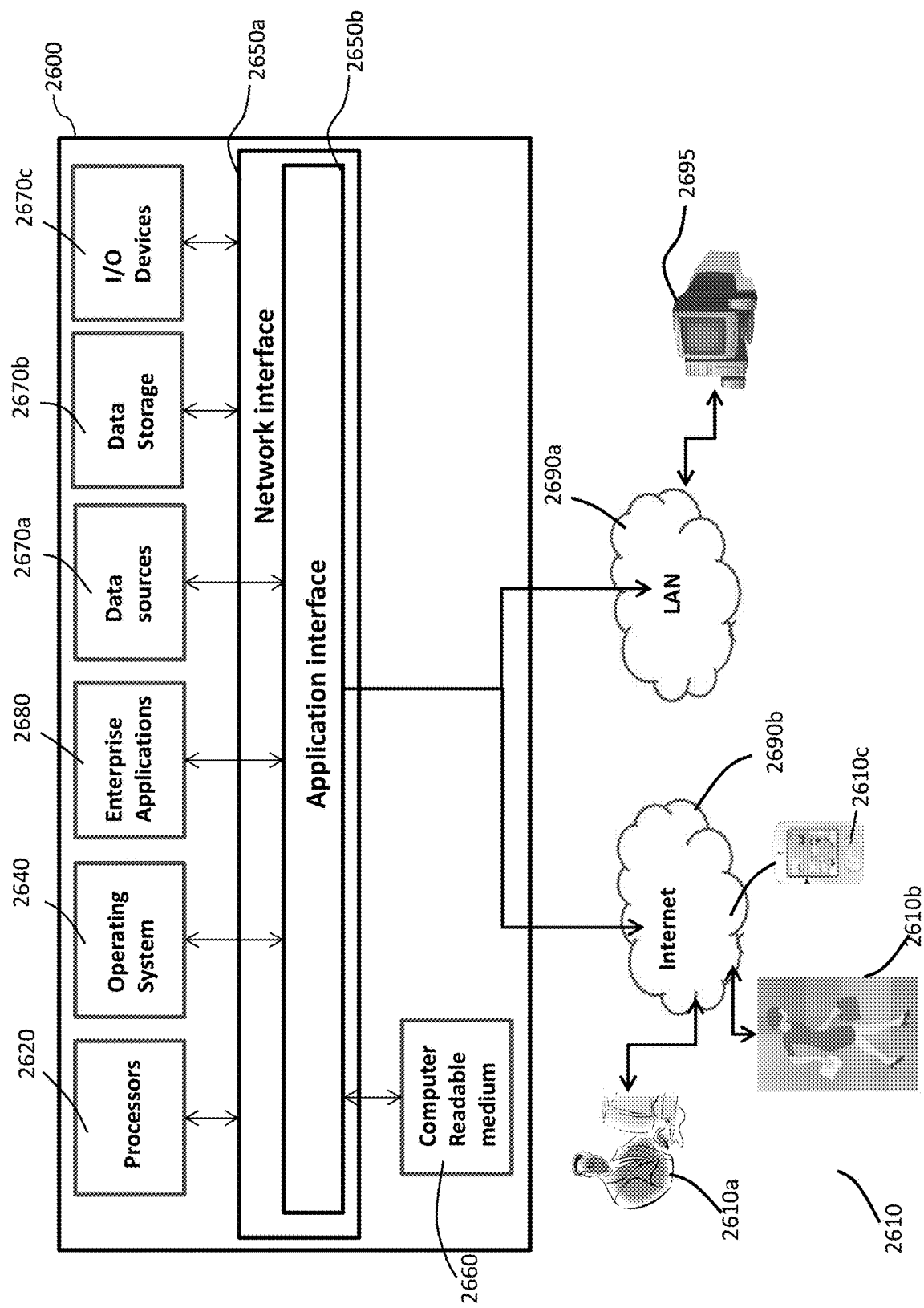
FIG. 26 illustrates an example computing system of an open house real estate system in accordance with some embodiments of the invention.

FIG. 26 illustrates a computer system 2600 configured for operating and processing components of the real estate systems and method in accordance with some embodiments of the invention. In some embodiments, the computer system 2600 can process one or more software modules of the aforementioned open house real estate system, server and method, and can include program logic to display information related to open house real estate within one or more graphical user interfaces. For example, any of the non-limiting embodiments including displays, portals, or web pages described earlier can be processed and controlled by the computer system 2600. Further, in some embodiments, the above-mentioned application work flows of the open house real estate system, server and method system, server and method shown in FIGS. 2 and 3 can use the computer system 2600 to process one or more open house real estate system, server and method application services. In some embodiments, the real estate system framework can also manage the organization of data and data flow between the open house real estate system, server and method application services, the front-end systems, and external (third party) computer systems including one or more backend computer systems.

In some embodiments, the computer system 2600 can comprise at least one computing device including at least one processor 2620. In some embodiments, the at least one processor 2620 can include a processor residing in or coupled to one or more server platforms. In some embodiments, the computer system 2600 can include a network interface 2650a and an application interface 2650b coupled to the least one processor 2620 capable of processing at least one operating system 2695. Further, in some embodiments, the interfaces 2650a, 2650b coupled to at least one processor 2620 can be configured to process one or more of the software modules 2680 (e.g., such as enterprise applications). In some embodiments, the software modules 2680 can include server-based software that can include open house real estate system, server and method software modules. In some embodiments, the software modules 2680 can operate to host at least one user account and/or at least one client account, and operating to transfer data between one or more of these accounts using the at least one processor 2620.

With the above embodiments in mind, it should be understood that the invention can employ various computer-implemented operations involving open house real estate system, server and method data stored in computer systems. Moreover, the above-described databases and models throughout the open house real estate system, server and method can store analytical models and other data on computer-readable storage media within the computer system 2600 and on computer-readable storage media coupled to the computer system 2600. In addition, the above-described applications of the open house real estate system, server and method system can be stored on computer-readable storage media within the computer system 2600 and on computer-readable storage media coupled to the computer system 2600. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments of the invention, the computer system 2600 can comprise at least one computer readable medium 2660 coupled to at least one data source 2670a, and/or at least one data storage device 2670b, and/or at least one input/output device 2670c. In some embodiments, the invention can be embodied as computer readable code on a computer readable medium 2660. In some embodiments, the computer readable medium 2660 can be any data storage device that can store data, which can thereafter be read by a computer system (such as the computer system 2600). In some embodiments, the computer readable medium 2660 can be any physical or material medium that can be used to tangibly store the desired information or data or instructions and which can be accessed by a computer or processor 2620. In some embodiments, the computer readable medium 2660 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 2660 can transmit or carry instructions to a computer 2695 and/or at least one user 2610, including a router, private or public network, or other transmission device or channel, both wired and wireless. The software modules 2680 can be configured to send and receive data from a database (e.g., from a computer readable medium 2660 including data sources 2670a and data storage 2670b that can comprise a database), and data can be received by the software modules 2680 from at least one other source. In some embodiments, at least one of the software modules 2680 can be configured within the system to output data to at least one user 2610 via at least one graphical user interface rendered on at least one digital display. Some embodiments include a digital gateway coupled to an application programming interface to provide distributed access to a database of information of at least one real estate property. Some embodiments including software comprising an event engine configured to manage an open house event of the at least one property including scheduling of a date and time of the open house event, and the scheduling of at least one prospective buyer. Other non-limiting example embodiments include software applications that can include a statistics engine that can track one or more attributes of a prospective buyer such as the movement, behavior, and/or preferences of the prospective buyer prior to and/or during an open house event.

Some further embodiments include a digital gateway coupled to an application programming interface configured to provide distributed access to a database of information of at least one real estate professional. Some embodiments include a national online real estate agent database. In some embodiments, real estate agent can be searched on a national level and contact information including, but not limited to, photograph image, brokerage name or affiliation, address, phone number, website (if applicable), and email address can be accessed by entering the agent's first and last name and state in which they work. In some embodiments, this database can be created by combining the contact information from the members of the real estate system, server and method. In other embodiments, this database can be created by pulling a national or international database from local departments of real estate.

In some embodiments of the invention, the computer readable medium 2660 can be distributed over a conventional computer network via the network interface 2650a where the open house real estate system, server and method system embodied by the computer readable code can be stored and executed in a distributed fashion. For example, in some embodiments, one or more components of the computer system 2600 can be coupled to send and/or receive data through a local area network ("LAN") 2690a and/or an Internet coupled network 2690b (e.g., such as a wireless Internet). In some further embodiments, the networks 2690a, 2690b can include wide area networks ("WAN"), direct connections (e.g., through a universal serial bus port), or other forms of computer-readable media 2660, or any combination thereof.

In some embodiments, components of the networks 2690a, 2690b can include any number of user devices such as personal computers including for example desktop computers, and/or laptop computers, or any fixed, generally non-mobile Internet appliances coupled through the LAN 2690a. For example, some embodiments include personal computers 2695 coupled through the LAN 2690a that can be configured for any type of user including an administrator. Other embodiments can include personal computers coupled through network 2690b. In some further embodiments, one or more components of the computer system 2600 can be coupled to send or receive data through an Internet network (e.g., such as network 2690b). For example, some embodiments include at least one user 2610 coupled wirelessly and accessing one or more software modules of the open house real estate system, server and method system including at least one enterprise application 2680 via an input and output ("I/O") device 2670c. In some other embodiments, the computer system 2600 can enable at least one user 2610 to be coupled to access enterprise applications 2680 via an I/O device 2670c through LAN 2690a. In some embodiments, the user 2610 can comprise a user 2610a coupled to the computer system 2600 using a desktop computer, and/or laptop computers, or any fixed, generally non-mobile Internet appliances coupled through the Internet 2690b. In some further embodiments, the user 2610 can comprise a mobile user 2610b coupled to the computer system 2600. In some embodiments, the user 2610b can use any mobile computing device 2610c to wireless coupled to the computer system 2600, including, but not limited to, personal digital assistants, and/or cellular phones, mobile phones, or smart phones, and/or pagers, and/or digital tablets, and/or fixed or mobile Internet appliances, or virtual reality display devices (e.g., such as VR helmets, goggles or glasses).

In some embodiments, the computer system 2600 can enable one or more users 2610 coupled to receive, analyze, input, modify, create and send data to and from the computer system 2600, including to and from one or more enterprise applications 2680 running on the computer system 2600. In some embodiments, at least one software application 2680 running on one or more processors 2620 can be configured to be coupled for communication over networks 2690a, 2690b through the Internet. In some embodiments, one or more wired or wirelessly coupled components of the network 2690a, 2690b can include one or more resources for data storage. For example, this can include any other form of computer readable media in addition to the computer readable media 2660 for storing information, and can include any form of computer readable media for communicating information from one electronic device to another electronic device.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the present invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations, steps or processes described herein can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the description.

The invention claimed is:

1. A computer-implemented method comprising:
providing a computer system including at least one processor coupled to at least one non-transitorily stored real estate database;
providing at least one non-transitory computer-readable storage medium in data communication with the at least one processor, the at least one non-transitory computer-readable storage medium including program logic that when executed by the at least one processor, causes the computer system to access or exchange data with the real estate database comprising open house data related to at least one property intended to be marketed through an open house event;
providing an application programming interface (API) in data communication with the at least one processor and the at least one non-transitory computer-readable storage medium, and executing at least a portion of the program logic by the (API) to upload and/or download the real estate database;
creating a user interface (UI) to a source of client data, the UI configured to read and transfer client data under control of a user via the (API) to a user display;

providing a digital gateway coupled to the (API) and enabling, by the at least one processor, a distributed access to third party real estate information of at least one property;

executing an event engine by at least a portion of the program logic executable by the at least one processor to manage at least one of the open house events of the at least one property including scheduling of a date and time of the at least one open house event and the scheduling of attendance of at least one prospective buyer; and executing a statistics engine by at least a portion of the program logic executable by the at least one processor to record open house real estate data including attribute data of the at least one prospective buyer prior to and during the at least one open house event, wherein the attribute data comprises a position, movement, or behavior of the at least one prospective buyer during an open house event.

2. The computer-implemented method of claim 1,
wherein the position, movement, or behavior of the at least one prospective buyer is received from at least one sensor coupled to the computer system.

3. The computer-implemented method of claim 2,
wherein the at least one sensor is coupled to the at least one prospective buyer and provides at least geo-location information to the computer system.

4. The computer-implemented method of claim 2,
wherein the at least one sensor provides information to the computer system as the open house real estate data enabling automatic check-in of the at least one prospective buyer.

5. The computer-implemented method of claim 2,
wherein the at least one sensor comprises a camera.

6. The computer-implemented method of claim 2,
wherein the at least one sensor is carried or worn by the at least one prospective buyer.

7. The computer-implemented method of claim 2,
wherein the at least one sensor is positioned in the at least one property.

8. The computer-implemented method of claim 2,
wherein at least some of the open house data comprises sensor data from the at least one sensor, the sensor data including at least one of an image or video of the at least one prospective buyer, at least one body or physical appearance image of the at least one prospective buyer, at least one object worn or carried by the at least one prospective buyer, at least one gesture of the at least one prospective buyer, and/or at least one portion of an environment data surrounding the at least one prospective buyer.

9. The computer-implemented method of claim 1,
wherein the attribute data further comprises preference data received by the statistics engine from a prospective buyer prior to, during, and/or after an open house event.

10. The computer-implemented method of claim 9,
wherein the preference data includes at least one of size of the at least one property, a number and/or size of bedrooms in the at least one property, a number and/or size of bathrooms in the at least one property, a type of finish, a type of landscaping, a type of neighborhood, location, a price, a price range, and feedback on the at least one property by the at least one prospective buyer.

11. The computer-implemented method of claim 10,
wherein the feedback comprises at least one rating selected by the at least one prospective buyer from a display on the user display.

12. The computer-implemented method of claim 11,
wherein the display on the user display includes at least one rating influence selectable by the at least one prospective buyer, the at least one rating influence including at least one of a floorplan, size of bedrooms, size of bathrooms, kitchen, finishes, landscaping, neighborhood, and price.

13. The computer-implemented method of claim 1,
wherein the at least one open house event includes a display on the user display of exclusively open house data.

14. The computer-implemented method of claim 13,
wherein the open house data is displayed on a map on the user display and is filterable for display on the map by at least one of a type of property selected from a group of houses, condominiums, townhomes, and manufactured homes, and size of the at least one property, a number and/or size of bedrooms in the at least one property, a number and/or size of bathrooms in the at least one property, a type of finish in the at least one property, a type of landscaping at the at least one property, a type of neighborhood, a location of the at least one property, a sales status of the at least one property, and a price or price range of the at least one property.

15. The computer-implemented method of claim 11,
wherein the at least one open house event includes generating a display on the user display comprising at least one of check-in data of at least one prospective buyer, and rating data from the at least one prospective buyer, a guest list including at the at least one prospective buyer, and an event chat window related to the at least one property of the at least one open house event.

16. A realty marketing system comprising:

a computer system including at least one processor coupled to a digital gateway coupled to provide distributed access to non-transitorily stored real estate information relating to at least one property;

at least one non-transitory computer-readable storage medium in data communication with the at least one processor, the at least one non-transitory computer-readable storage medium configured for accessing or exchanging data with a real estate database;

an application programming interface in data communication with the at least one processor and the at least one non-transitory computer-readable storage medium, the (API) including program logic executable by the at least one processor for uploading, downloading, and/or enabling access of data from the real estate database related to at least one property intended to be marketed as an open house;

an interface to a source of client data or records, the interface configured to read and transfer client data under control of a user via the (API) to a user display;

an event engine including logic executable by the at least one processor to manage at least one open house event of the at least one property including scheduling of a date and time of the at least one open house event and the scheduling attendance of at least one prospective buyer; and a statistics engine including logic executable by the at least one processor to record attribute data of the at least one prospective buyer prior to and during the at least one open house event, wherein the attribute data comprises a position, movement, or behavior of the at least one prospective buyer during an open house event.

17. The realty marketing system of claim 16,
wherein the attribute data further comprises preference data received by the statistics engine of the at least one prospective buyer prior to, during, and/or after open house event.

18. The realty marketing system of claim 16,
wherein the preference data includes at least one of size of the at least one property, a number and/or size of bedrooms in the at least one property, a number and/or size of bathrooms in the at least one property, a type of finish, a type of landscaping, a type of neighborhood and/or location, and a price or price range.

19. The realty marketing system of claim 16,
wherein the preference data includes at least one of feedback on the at least one property by the at least one prospective buyer, and
wherein the feedback comprises at least one rating selected by the at least one prospective buyer from a display on the user display, and a rating influence selectable by the at least one prospective buyer, the at least one rating influence including at least one of a floorplan, size of bedrooms, size of bathrooms, kitchen, finishes, landscaping, neighborhood, and price.

20. The computer-implemented method of claim 1,
wherein the scheduling of attendance of at least one prospective buyer is based on receipt of a response from the at least one prospective buyer from an invitation sent by a listing agent of the at least one property of the at least one open house event.

21. The realty marketing system of claim 16,
wherein the scheduling of attendance of at least one prospective buyer is based on receipt of a response from the at least one prospective buyer from an invitation sent by a listing agent of the at least one property of the at least one open house event.

* * * * *